(12) United States Patent
Lewis et al.

(10) Patent No.: US 7,363,242 B2
(45) Date of Patent: Apr. 22, 2008

(54) INTERNET BASED AIRLINE TICKET PURCHASING AND VACATION PLANNING SYSTEM AND METHOD

(75) Inventors: Simon Lewis, Dubai (AE); Amir Meskovic, Dubai (AE); Hassnain Chagani, Dubai (AE)

(73) Assignee: Emirates, Dubai (AE)

( * ) Notice: Subject to any disclaimer, the term of this patent is extended or adjusted under 35 U.S.C. 154(b) by 551 days.

(21) Appl. No.: 10/880,596

(22) Filed: Jul. 1, 2004

(65) Prior Publication Data

US 2005/0021424 A1  Jan. 27, 2005

Related U.S. Application Data

(60) Provisional application No. 60/488,390, filed on Jul. 21, 2003.

(51) Int. Cl.
*G06Q 10/00* (2006.01)
(52) U.S. Cl. .................... 705/5; 705/6; 705/26; 705/27
(58) Field of Classification Search .................... 705/5, 705/6, 26, 27
See application file for complete search history.

(56) References Cited

U.S. PATENT DOCUMENTS 5,570,283 A * 10/1996 Shoolery et al. .............. 705/5

(Continued)

FOREIGN PATENT DOCUMENTS

WO     WO 01 99003 A1    12/2001

(Continued)

OTHER PUBLICATIONS

Joan M. Feldman, Package deal; dynamic packaging appears to offer something to everybody; one-stop shopping for customers, opaque pricing for suppliers; but the concept is still evolving and hurdles remain., Mar. 2003, Air Transport World, vol. 40, No. 3, pp. 1-3.*

(Continued)

*Primary Examiner*—Matthew Gart
*Assistant Examiner*—Jason B. Dunham
(74) *Attorney, Agent, or Firm*—Bardmesser Law Group

(57) ABSTRACT

A system and method of processing a travel plan request from a customer includes (1) receiving customer information from a customer; (2) storing in a database the customer information; (3) sending to an agent a notification by an email, the notification including a link to the website, wherein the agent can access package request details by navigating to the link; (4) sending to the agent periodic re-notifications if the agent fails to respond within a first predetermined period of time; (5) displaying to the agent the package request details on the website; (6) receiving via the website a response to the email from the agent; (7) storing in the database the response from the agent; (8) sending to the customer a notification of the response from the agent; (9) sending a re-notification to the customer if the customer fails to respond within a second predetermined period of time; (10) displaying to the customer a package quotation based on the response from the agent, wherein the package quotation includes any combination of budget, destination, origin, departure and return dates, preference of hotel type, preference of hotel room, preference of meal type, preference of flight type, flight class, number of passengers (adults, children, infants), additional remarks; (11) from the customer receiving a response indicating an acceptance or a rejection; (12) upon acceptance, sending an email to the agent with details of customer acceptance.

16 Claims, 11 Drawing Sheets

U.S. PATENT DOCUMENTS

| | | | |
|---|---|---|---|
| 5,832,451 A * | 11/1998 | Flake et al. | 705/5 |
| 7,136,821 B1 * | 11/2006 | Kohavi et al. | 705/5 |
| 2002/0035493 A1 * | 3/2002 | Mozayeny et al. | 705/5 |
| 2002/0072937 A1 * | 6/2002 | Domenick et al. | 705/5 |
| 2002/0184060 A1 * | 12/2002 | Schmitz et al. | 705/6 |
| 2003/0097274 A1 * | 5/2003 | Parsons | 705/1 |
| 2003/0120526 A1 * | 6/2003 | Altman et al. | 705/5 |
| 2003/0144867 A1 * | 7/2003 | Campbell et al. | 705/1 |
| 2004/0039617 A1 * | 2/2004 | Maycotte et al. | 705/5 |
| 2004/0249683 A1 * | 12/2004 | Demarcken et al. | 705/5 |
| 2005/0033613 A1 * | 2/2005 | Patullo et al. | 705/5 |
| 2006/0111956 A1 * | 5/2006 | Whitesage | 705/8 |
| 2006/0259335 A1 * | 11/2006 | La Macchia et al. | 705/6 |
| 2006/0293931 A1 * | 12/2006 | Fitzgerald et al. | 705/5 |

FOREIGN PATENT DOCUMENTS

WO    WO 02/37433 A2    5/2002

OTHER PUBLICATIONS

English abstract for Japanese Publication No. 2002149696, publication date May 25, 2002, 1 page.

European Search Report for European Application No. EP 04 25 4349, 3 pages.

Messages 1-10 from-thread "eBay find another way to annoy it's users," http://groups.google.com/groups?hl=en&lr=&safe=off&th=1273ao..., retrieved from the internet Feb. 11, 2004, 3 pages.

\* cited by examiner

INTERNET BASED AIRLINE TICKET PURCHASING AND VACATION PLANNING SYSTEM AND METHOD

CROSS-REFERENCE TO RELATED APPLICATIONS

This application is a non-provisional of U.S. Provisional Patent Application No. 60/488,390, filed on Jul. 21, 2003, entitled INTERNET BASED AIRLINE TICKET PURCHASING AND VACATION PLANNING SYSTEM AND METHOD, which is incorporated herein by reference.

BACKGROUND OF THE INVENTION

1. Field of the Invention

The present invention relates to web-based travel and vacation planning systems.

2. Related Art

Travel planning systems are used to produce itineraries and prices by selecting suitable travel units from databases containing geographic, scheduling and pricing information. In the airline industry, fundamental travel units include "flights" (sequences of regularly scheduled takeoffs and landings assigned a common identifier) and "fares" (prices published by airlines for travel between two points). The term "itinerary" is often used to refer to a sequence of flights on particular dates, and the term "pricing solution" is often used to refer to a combination of fares and itineraries that satisfies a travel request.

The databases usually contain schedule information provided by airlines, typically in the so-called Standard Schedules Information Manual (SSIM) format, and usually fares published by airlines and resellers, typically provided through the intermediary Airline Tariff Publishing Company (ATPCO). The database may also contain "availability" information that determines whether space is available on flights. Alternatively, available information may be obtained through communication links to external sources such as airlines.

Presently, so-called computer reservation systems (CRSs, also sometimes known as Global Distribution Systems, or GDSs, or, alternatively, as "consolidators") operate to produce fare and schedule information. The four primary computer reservation systems that operate in the United States and in many other countries are Sabre™, Galileo™, Amadeus™ and WorldSpan™. A typical CRS contains a periodically updated central database that is accessed by subscribers, such as travel agents, through computer terminals. The subscribers use the computer reservation system to determine what airline flights are operating in a given market, what fares are offered and whether seats are available on flights to make bookings and issue tickets to clients.

The computer reservation systems typically conduct searches using the information contained in the database to produce itineraries that satisfy a received request. The search results are sorted and returned to the requester's computer for display. Often, the number of possible itineraries and pricing solutions that are returned by a CRS is a small portion of the total set that may satisfy a passenger's request.

A number of problems exist with conventional websites often used by consumers to book their vacations and flight plans. For example, many websites return a number of flight options, including low priced options, even when there are no seats available on those flights. Thus, if a consumer wanted to actually book the lowest fare, he would be unable to, and would be redirected to the higher fare.

Another problem exists in the nature of the reservation process. A consumer can often reserve a seat for up to 48 hours without actually paying for it. This requires the airline to hold inventory, without being certain that the inventory will actually be sold as booked.

Yet another problem exists in that the GDSs charge $4.50 per flight leg, and $30 for hotel bookings. These numbers can add up quickly. Thus, many airlines and/or travel websites would like to eliminate the middleman (i.e., the GDSs) so as to provide a lower fare to the consumer.

SUMMARY OF THE INVENTION

The present invention is directed to an internet based airline ticket purchasing and vacation planning system and method that substantially obviates one or more of the problems and disadvantages of known systems.

In one aspect, there is provided a system and method of processing a travel plan request from a customer including: (1) receiving customer information from a customer; (2) storing in a database the customer information; (3) sending to an agent a notification by an email, the notification including a link to the website, wherein the agent can access package request details by navigating to the link; (4) sending to the agent periodic re-notifications if the agent fails to respond within a first predetermined period of time; (5) displaying to the agent the package request details on the website; (6) receiving via the website a response to the email from the agent; (7) storing in the database the response from the agent; (8) sending to the customer a notification of the response from the agent; (9) sending a re-notification to the customer if the customer fails to respond within a second predetermined period of time; (10) displaying to the customer a package quotation based on the response from the agent, wherein the package quotation includes any combination of budget, destination, origin, departure and return dates, preference of hotel type, preference of hotel room, preference of meal type, preference of flight type, flight class, number of passengers (adults, children, infants), additional remarks; (11) receiving from the customer a response indicating an acceptance or a rejection of the package quotation; (12) upon acceptance, sending an email to the agent with details of customer acceptance.

In another aspect, there is provided a system for processing a travel-related package request from a customer including means for receiving customer information; means for storing in a database the customer information; means for sending a notification to an agent, wherein the agent can access package request details in the database; means for sending to the agent periodic re-notifications if the agent fails to respond within a first predetermined period of time; means for displaying to the agent the package request details; means for receiving a response from the agent; means for storing in the database the response from the agent; means for notifying the customer of the response; and means for displaying to the customer a package quotation based on the response from the agent. The package quotation includes any of budget, destination, origin, departure and return dates, preference of hotel type, preference of hotel room, preference of meal type, preference of flight type, flight class, number of passengers, and additional remarks. Also included are means for receiving from the customer an acceptance or rejection; and upon acceptance, means for notifying the agent of the details of the acceptance.

In another aspect, a method for processing a flight booking request from a customer includes receiving flight request information from a customer; querying a Global Distribution System for a quotation; displaying only the available fares to the customer; and periodically notifying the customer of available fares. The step of querying a Global Distribution System for a quotation also queries a Private Fares database for the quotation. The flight request information can have flexible travel dates. The method can also include receiving customer information from a customer that includes any of customer email address, customer name, telephone number, budget, destination, origin, departure and return dates, preference of meal type, preference of flight type, flight class, number of passengers, and additional remarks. The notification can be based on the customer information. The flight request information can be stored in a local database for later re-use with other searches by other customers. The above method can also by implemented as a system and as a computer program product.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGS.

The accompanying drawings, which are included to provide a further understanding of the exemplary embodiments of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the present invention, examples of which are illustrated in the accompanying drawings.

TABLE OF CONTENTS

I. Introduction
II. Solution Architecture
III. Hosting
IV. Product Management System
V. Package Approval Workflow
VI. Package Quotation System
VII. Building a package quotation
VIII. Discounter
IX. myFareWatcher
X. Deposit Model and Cross Sell
XI. Deposit model
XII. Booking cruises
XIII. Booking events
XIV. Booking hotels
XV. Booking packages
XVI. Booking flights

CONCLUSION

I. Introduction

The present application describes a comprehensive system and method for enabling a consumer to book his or her travel and vacation. It also describes a mechanism to eliminate some of the clutter present on many conventional travel websites, as well as give the travel agent an opportunity to avoid some of the GDS fees and thereby provide a discount to consumers. It should be noted that although solely for convenience, the discussion herein is primarily in terms of interfacing to the Galileo GDS, the invention is equally applicable to interfacing to other GDSs, such as WorldSpan™, Amadeus™, etc. Alternatively, in addition to interfacing with just one GDS, the invention can work with all the GDSs, or with a subset of the GDSs.

Conscious of the cost of the GDS, the airlines would prefer to remove the intermediary altogether. This has resulted in virtually all of the large airlines having their own central reservation systems, to which the consumer has direct access through the Internet. Similarly, hotels and car rental agencies would like to eliminate the middleman.

Figure 1:
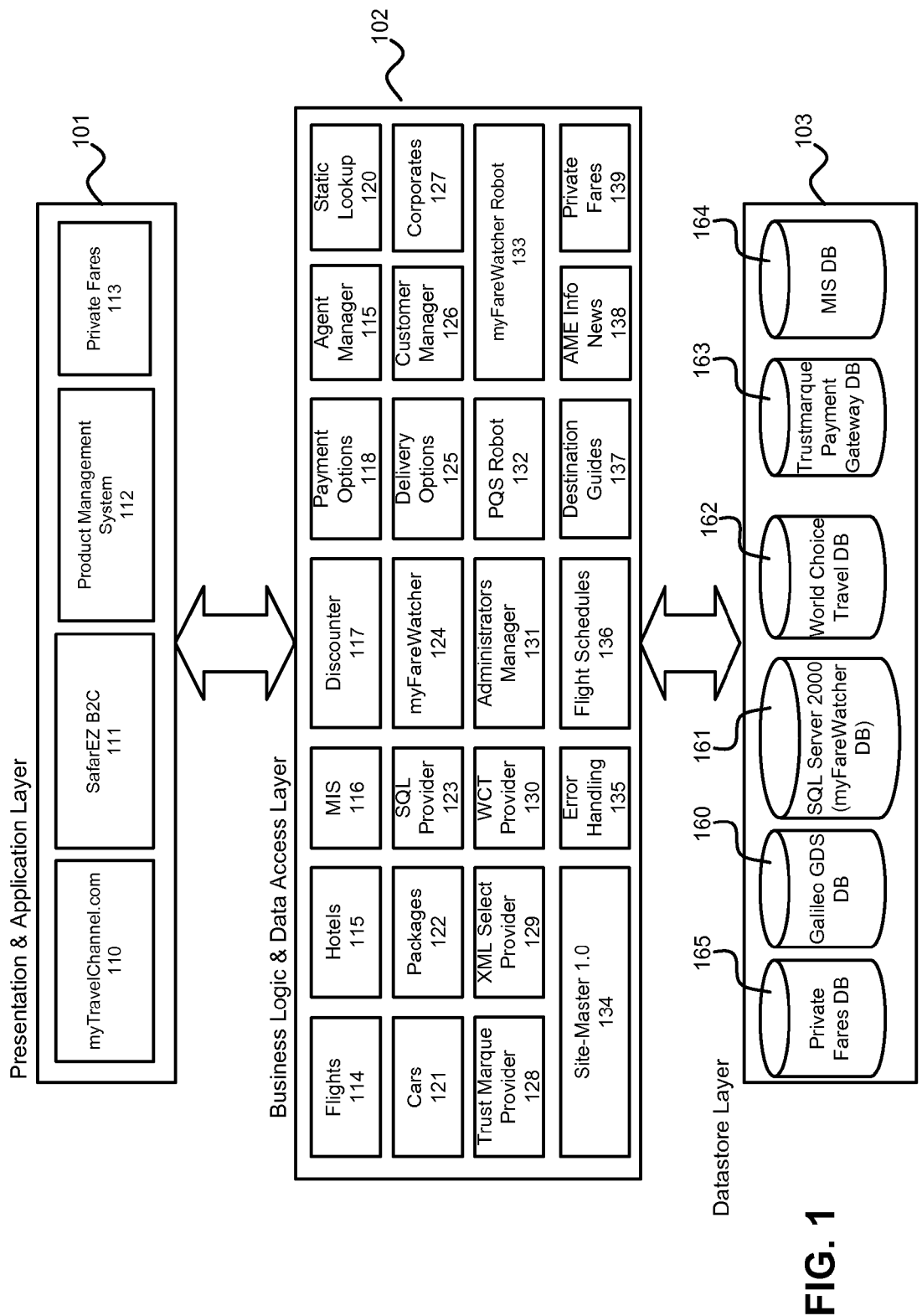
FIG. 1 shows a multi-layered architecture of the system of the present invention.

With that in mind, in one preferred embodiment, which is illustrated in FIG. 1, discussed further below, the broad solution requirements/preferences include the following:

1. Use of Microsoft .NET approach.
2. Interface with Galileo's GDS (or another GDS) using XML Select for Air (an Internet booking engine for flights).
3. Merge Product Management System (discussed below) as part of the new solution.
4. Interface with third party suppliers using XML, such as: World Choice Travel (Internet Booking Engine for Hotels, discussed below), and TrustMarque Payment Gateway (discussed below)
5. Reduce third party development costs
6. Reduce time to market (from idea concept to full implementation)
7. Build Private Fares Database and incorporate it as part of the solution to support "special" fares by agents
8. Allow default partners in each market, but provide for multiple agents supporting single board points
9. Allow for airline offices to ticket their own segments (bookings to go directly to their offices and not to the agent)
10. Provide "class driven" search using Super Best Buy
11. Provide customized websites
12. Provide for FFP (frequent flyer program) driven search
13. Provide for Airline-specific search
14. Provide a tracking mechanism for packages referred on myTravelChannel to internal partners (i.e., Package Quotation System, or PQS, discussed below)

In addition to a full business-to-consumer solution, the following additional components, discussed below, are offered in the solution:

1. Internet booking engine for Hotels using Galileo or other GDSs
2. Internet booking engine for car vendors using Galileo or other GDSs (e.g., Holiday Autos)
3. Product Management System
4. Creation and customization of agent websites via SiteMaster 6.0
5. Discounter Model
6. myFareWatcher
7. Deposit Model
8. Full system administration on Super/Country/City/Agent/User/Corporate levels using the Product Management System (PMS)
9. Corporate Booking Engine
10. Flight Schedules
11. Cancellations of Live PNR's (Passenger Name Records, i.e., booking numbers assigned to each booking) from Galileo
12. Retrieval of Live PNR's from Galileo
13. Creation of mixed type PNR's (single PNR that holds Air, Car and Hotel information)
14. Customized Branded Websites
15. Package Quotation System The overall offering to the business is a solution that has:

1. Internet Booking Engine for all Airlines using (for example) Galileo
2. Internet Booking Engine for all hotels on Galileo
3. Internet Booking Engine for all hotels on USA Hotel Guide via World Choice Travel
4. Internet Booking Engine for all car vendors on Galileo
5. Secure online credit card transaction processing with risks analysis using TrustMarque/Natwest solution
6. Product Management System (PMS), which includes:
   a. Packages Management
   b. SiteMaster
   c. Private Fares
   d. Customers Management
   e. Corporate Booking
   f. Workflow
   g. Discounter
   h. Deposit Model
7. MIS/CRM (customer relationship management) Data
8. Database of registered users In an exemplary embodiment, the solution is written using the following languages: ASP.NET; VB.NET; COM; JavaScript; VBScript; XML; T-SQL; and HTML.

II. Solution Architecture

Figure 2:
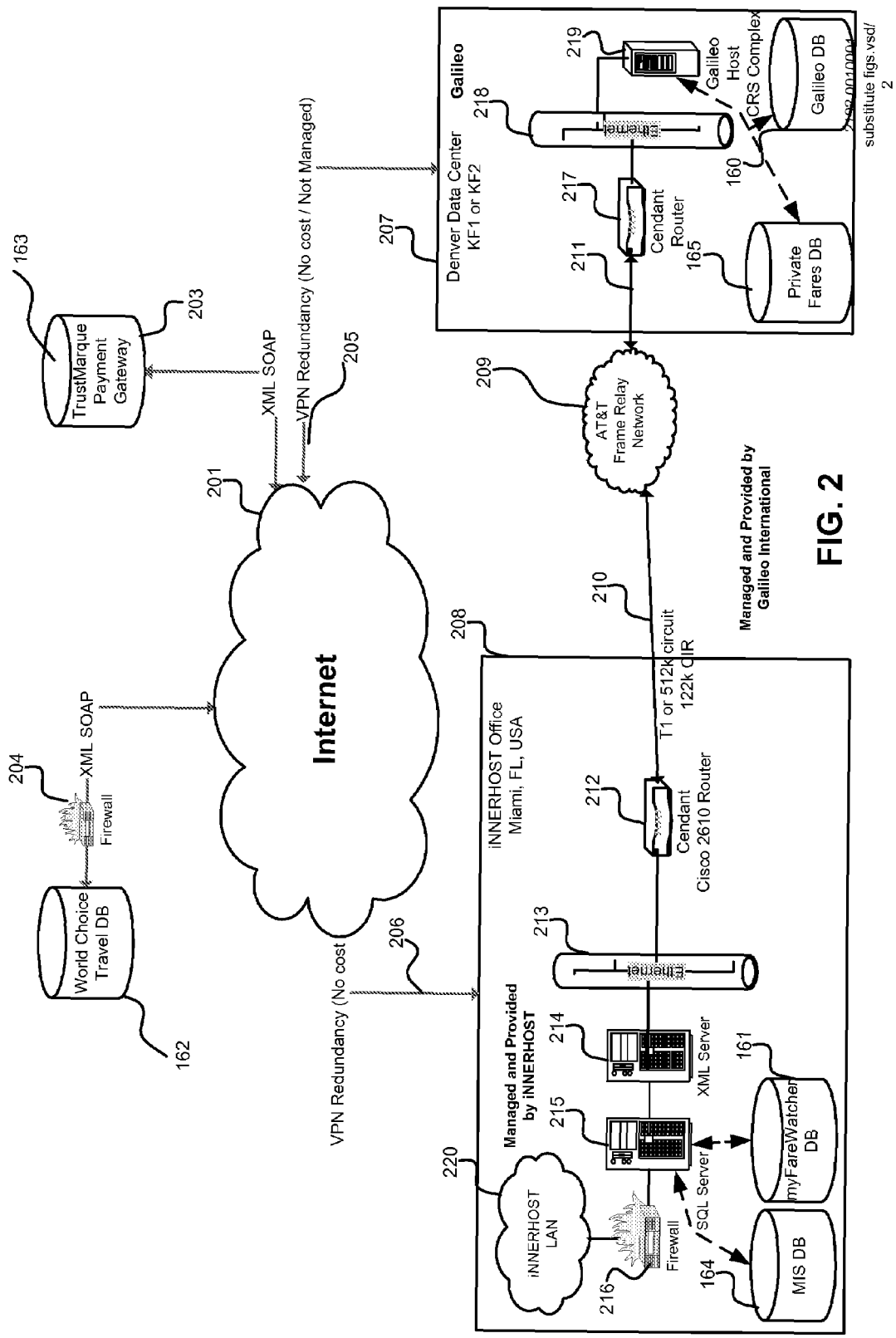
FIG. 2 shows a hosting diagram of one embodiment of the present invention.

The overall architecture is shown in FIG. 1, and includes three layers: a Presentation and Application Layer 101, a Business Logic and Data Access Layer 102 (hereafter, "Business Logic Layer" or simply "Business Logic", which generally resides at a host site, such as 220 in FIG. 2), and a Datastore Layer 103. Each of these layers includes a number of components, as shown in FIG. 1.

The Presentation and Application Layer 101 includes graphics/images/ASPX files and Code Behind files, which are all used to process and render processed information to the end client, and to collect, validate and pass information from the end client to the Business Logic Layer 102 for processing. In other words, layer 101 is responsible for direct interaction with the end client.

The Presentation and Application Layer 101 also includes the myTravelChannel.com component 110, the SafarEZ business to consumer presentation component 111, the Product Management System (PMS) component 112, and a Private Fares component 113.

The Presentation & Application Layer 101 is the front-end interface of the Business Logic & Data Access Layer 102. This interface includes pages, forms, buttons, images, datalists, datagrids and other controls used in presentation of data to the end-user.

The Presentation & Application Layer 101 can include two sub-layers (not shown in the figures), which are:

1. Presentation Code (ASPX, ASCX and HTML files)
2. Code Behind (VB files)

The presentation code includes pages that contain elements of display such as forms, images, buttons, etc., which are used for visual and data collection purposes.

Code Behind layer is code that interfaces the Presentation and Application Layer 101 with the Business Logic & Data Access Layer 102 and passes information between these layers for retrieval/processing/storing purposes. It also defines behavior of controls and elements within the Presentation and Application Layer 101 based on the content passed from and to the Business Logic Layer 102. This layer also includes all the presentation code/Code Behind for the following applications:

1. myTravelChannel.com 110
2. SafarEZ B2C 111
3. Product Management System 112
4. Private Fares 113 myTravelChannel.com 110 is an application, within the Presentation & Application Layer, that includes a series of ASPX pages, HTML pages, ASCX Controls, Images, and Cascading Style Sheets. It belongs to a namespace called TravelChannel and can include two separate entities, for example, Arabic and English.

Using XML Select, the interface to the Galileo GDS 207 is established, to access and book live inventory for flights, hotels and cars. Using XML SOAP (simple object access protocol), the interface to the USA Hotel Guide's online inventory management system is performed, to access/book additional hotel deals and live hotel. Using XML SOAP, the interface to the TrustMarque Payment Gateway 163 is performed, to process online transactions and analyze the risk associated with those transactions. (It will be appreciated that although the discussion in this text is primarily in terms of TrustMarque Payment Gateway, the invention is not limited to the Trust Marque Payment Gateway, and other payment gateways may be used, for example, a BIBIT payment gateway, see, e.g., http://www.bibit.com/).

The following sections/components can be included in the myTravelChannel 110 application: Cruises, Hotels, Packages, Events, Flights, Partners, Cars, Controls, Utilities. These are discussed further below.

The Business Logic Layer 102 acts as a buffer between the Datastore Layer 103 and the Presentation & Application Layer 101. It retrieves processes and stores data that is being passed between the Presentation & Application Layer 101 and Datastore Layer 103. It applies predefined business rules to any proposed transaction.

The Business Logic Layer 102 includes the various components for interfacing with the appropriate databases and external data sources. For example, the Business Logic Layer 102 includes interface modules, such as modules for interfacing to flights databases (114), interfacing to flight schedules database(s) 136, interfacing to hotels databases (115), interfacing to MIS (116), interfacing to car rental databases (121), interfacing to packages databases (122), and interfacing to discounter databases (117).

The Business Logic Layer 102 also includes interface modules for interfacing to an SQL provider (123), myFareWatcher 124, delivery options 125, customer manager 126, an interface to any external/corporate databases (127), TrustMarque provider 128, XML Select provider 129, and a World Choice Travel provider 130. Administrative modules include SiteMaster 1.0 (134) (a website management module), an error handing module 135, and an administrator's manager module 131. Other modules link to destination guides database (137), AME Info News (138), private fares (139), two robots module a myFareRobot 133, a PQS robot 132, discussed further below.

The Datastore Layer 103 is used to get the relevant data, based on the transaction requirement, from one and/or multiple data sources that provide data to the solution.

The Datastore Layer 103 includes links to the Galileo database 160 (see also Galileo data center 207 in FIG. 2), links to World Choice Travel 162, links to TrustMarque Payment Gateway 163, links to an MIS database 164, to a Private Fares database 165 and to an SQL Server 2000 database (myFareWatcher database) 161.

III. Hosting

The solution is currently hosted by a hosting industry provider Interland. (See http://www.interland.com/ and discussion of FIG. 2 below, although the invention is not limited to this hosting scheme). The solution consists of two servers (one IIS XML server and one SQL server) and a dedicated firewall. The maintenance of the servers can be outsourced to Interland, while full administrative access to both servers is retained through the Internet using Terminal Services Clients.

As further shown in FIG. 2, the business solution, in one example, includes a number of interconnected elements provided by different suppliers.

For example, one exemplary supplier is Interland 208, which includes a connection line 210 to a router 212, an Ethernet 213, an IIS XML server 214, an SQL server 215, a LAN 220, and a firewall 216. The Interland office 208 is connected through an AT&T frame relay network 209 to a data center 207, which includes another router 217, an Ethernet 218, and a Galileo host CRS complex 219 (the Galileo database 160 typically resides there). The data center 207 is connected using virtual private network 205 to the Internet 201, and through the Internet to World Choice Travel database 162 (using a firewall 204). There is also a connection to a TrustMarque Payment Gateway database 163 using XML SOAP protocol 203.

With the exception of packages, which are built using the Product Management System 112, the live inventory comes from third party data sources, such as Galileo GDS 207, World Choice Travel 162, and TrustMarque Payment Gateway 163.

IV. Product Management System

The Product Management System (PMS) 112 allows management of the following:

1. Agent Profiles
2. Agent Packages
3. Agent Discounts
4. Agent Private Fares
5. Agent Websites
6. Multiple agents per single board point
7. Airline specific fulfillment The Product Management System 112 allows agents to manage packages (holiday vacations) online and allows site administrators to manage content/offering provided to both agents and visitors of the site. The Product Management System 112 includes the following sections: (1) Packages, (2) Private Fares, (3) Discounter, (4) Agents, (5) Administrators, (6) Components, (7) Component Groups, (8) Image Bank, (9) Statistics, (10) Activity Log, and (10) Types.

Private fares are typically offered to a particular agent by an airline. Private fares may be route specific (in other words, "this route and that route are discounted by 5% on airline X between origin A and destination B"), or on any other route that airline X flies or on any particular route, or on a particular airline generally. Normally, the consumer does not see private fairs. myTravelChannel 110 gives access to the consumer for private fares, in effect allowing the consumer to become his own travel agent.

The Packages module 122 allows the agents to manage their packages on various sites that they use to distribute their content. The agents use the Packages section to view, insert, update, delete and overall manage the packages that they distribute on one or many travel portals. Every package managed by the agents includes the following information:

Package Type: This is an indicator of what type/kind a package is. It is a dynamic list managed by administrators, which provides options such as: Holiday Package, Cruise Package, Event Package, etc.

Package Validity Dates: These are two dates between which the agent wishes to show his package as available to the end users. If the dates specified here match the users search criteria, the package is shown to the user as available for a booking request.

Package Image: From a drop down list, an agent is able to select one of X images which they have uploaded into their image bank to associate with this package.

Customizability: With this option, the agent specifies if the package is customizable or not. Customizable package enables the user to remove the original components specified by the agent as part of the package and add new ones. It enables the user to use an existing package uploaded by the agent as a template for building a customized package request.

Duration: Indicates the length/duration of the package. It is usually referred to in number of nights.

Reference: This field is used by the agent to specify a reference number (alphanumeric) which will uniquely identify this package in their organization. This could be either an existing reference number already used by the agent in the offline world for this package or a new reference number/indicator.

Title: This field is used to "Name" a package. This is used to identify the package to the end user (e.g., "enjoy a weekend escape in London").

Summary: describes a package in a few sentences. This is used as a preview of what the package contains and is displayed to the user in a search result screen where multiple packages are shown as options to the end user.

Description: This is used to fully describe what the package contains. Provided is a Rich Text Box Editor that allows the agent to use all the functionality usually provided by products such as Microsoft Word. The Agent by using this field is able to highlight certain features of the package, insert outside links, or simply copy-paste a ready made brochure in a DTP format. The user sees the information entered in this field when he/she selects a specific package.

The Product Management System 112 also provides the agents with a set of components that allows them to further describe their package. The end-user uses these same components to define his/her preferences (search criteria) which will then be used to find relevant packages. These components are grouped under "Component Groups" which are used to group those components of the same nature under individual headings. Examples of Component Groups are: Package Type, Accommodation, Special Requests, etc. Examples of components that belong to such groups are:

Package Type Group would typically contain components such as Romantic, Honeymoon, Adventure, etc.

Accommodation Group would typically contain components such as Villa Accommodation, Hotel Accommodation, Resort, etc.

Component Groups and their subsequent components are defined and managed via Product Management System 112 by Administrators, who can edit/add/delete groups and components on agent requests.

The selection of components by the end user is used to compare those components requested and those available in a certain package, which are used to calculate a search criteria match.

Special Offer: This field indicates whether this package is on special offer.

Origin/Destination/Pricing/Distribution: A package entered into the Product Management System 112 normally needs to have a point of origin and a destination point. The agents can use IATA Standard city codes, which the system then converts to cities and maps the entered codes to countries. With each package, an agent is able to specify an unlimited number of origin/destination points with each having an individual price and a distribution point. For example:

If an agent has a package entitled "Weekend Escape to London," he/she can specify in this section that this package, if consumed from Dubai will cost $200, but if consumed from Kuwait will cost $130.

In addition to the above, the agent can also specify a distribution channel for the origin/destination/pricing combination. Weekend Escape to London from Dubai would cost $200 on myTravelChannel.com 110 while the same package, if distributed on a different portal, could cost $230.

Times Viewed: This is an indicator (counter) that tells the agent how many times a specific package has been selected by the visitor. It is an indicator that is known as a LOOK ratio of the package.

Times Booked: This indicator provides the agent with the information on how many times a specific package has been booked by the visitors. Together with Times Viewed indicator agents are able to view LOOK to BOOK ratio on every package in the system.

DOE: Date of Entry is the date when the package was created by an agent.

Approved: As part of quality control, every package that gets inserted into the system needs to be approved by a site administrator. This field indicates whether a specific package has been approved or not. An inserted package does not appear to site visitors until it has been approved.

Approved On: This field indicates a date when the package has been approved.

Approved By: This field indicates who has approved this package.

Rejected: This is an indicator that specifies if the package has been rejected by a system administrator.

Rejection Reason: This field provides a reason why the package has been rejected. This is a free text entry by an administrator explaining their reason why this package has not been approved and provides feedback to the agent on what they need to change in order to get their package approved.

Rejected On: Provides a date when the package has last been rejected

By using the PMS 112, agents are able to manage all their packages. They can edit packages, insert packages, delete packages, and promote package on various sites. Filtered views allow agents to quickly find packages based on their status (Expired, Deleted, Waiting For Approval, Rejected, etc.) and to find out how well their packages are doing on various websites. ("Look to Book" ratios).

Most GDS charge a fee (currently, about $30) to process a booking for a hotel. If the middleman were eliminated, this would provide obvious benefits to the consumer, particularly, since the cost of the hotel when using the GDS databases must be at least the cost of the airfare, or higher. Tour operators normally strike deals with suppliers (i.e. hotels) and then sell the inventory to the travel agents. The approach of the Product Management System 112 is to start with a budget. The next step is to ask the consumer where he is traveling from. The next step is to ask the consumer where he is traveling to. The next step is to ask the consumer for the dates of travel. The next step is to define the type of package (a cruise, romantic vacation, family vacation, adventure, etc.). The next step is to specify the accommodations (a hotel, a villa, an apartment). The next step is to identify any add-ons (ski, water ski, climbing, hiking, etc.). Once the package characteristics are put together, then a search can be conducted.

V. Package Approval Workflow

Adding a new package: when an agent inserts a new package in the system, the package needs to go through a quality check control by designated system administrator before it can "go live" and be shown to site visitors. After a successful insertion of a package, the system sends an email to the system administrator informing them that a new package has been added and that it is waiting in their approval queue for review. At this point an agent who has inserted this package is also notified via email that their package has now been queued for approval. At this point, a system administrator logs on to the Product Management System 112 and reviews the package inserted into the system by an agent. The administrator has an option to either approve or reject a package. If the administrator decides to approve a package and clicks on an approve button, the package instantly becomes available to site visitors and the agent is informed via email that their package is now live. If, however, the administrator decides to reject a package, they have to provide a descriptive reason as to why a package has been rejected. This reason is then copied in an email that gets sent to the agent, informing them that their package has been rejected. In this case, the agent has an option to either amend the package using the feedback provided by an administrator in the reject reason or to delete a package.

Editing an existing pre-approved package: when an agent decides to edit an existing package that has already been approved, they are warned that the package they are about to edit will be taken offline. Once the agent makes the changes to the package, the package's LIVE status (APPROVED) is then changed to indicate that the package is no longer available to the site visitors.

A system administrator is then notified that a package inserted by the agent has been edited and the approval process repeats again.

VI. Package Quotation System

The Package Quotation System 132 (PQS) is a business process, system and method that provides a facilitation service between customer and supplier online in order to reach an agreement for a package online, the payment of which will be conducted offline when the customer collects or receives their travel documents. It includes customer interaction with the agent online and the whole negotiation/customization process by which the agent caters to additional customer's needs and the business gets visibility of all the transactions that happen with the customer. It allows the business to control package sales and ensure customer service on a much more detailed level.

The Package Quotation System 132 enables the agents to manage package booking requests created by site visitors for their packages. When a visitor selects an agent's package or creates a customized package request, they are presented with a form that, in addition to the basic contact information, requests the visitor to provide specific package details whilst making a package quotation request. The visitor specifies preferences such as travel dates, additional components and can also provide feedback on the package in a special "Additional Information" box provided as part of the package quotation request form.

Once the visitor submits the request, an agent is then informed via email that there has been a package quotation request for one of their packages. By logging on to PMS 112 and navigating to packages section, the agent is presented with the "Package Requests" option.

In the package requests section, the agent is able to view all package requests that have been submitted. Each package request has the following information:

Package Reference: indicates the reference number for a package for which the quotation request has been made.

Request Date and Time: indicates the date and time when the request was made.

Package Title: title of the package for which the request was made.

Request Status: indicates the current status of each request. Request status can have the following options:

Respond: package request has not yet been responded to.

Waiting for customer: the agent has responded back to the customer with a quotation, and the request originator now needs to either accept or reject the quotation.

Not Available: the agent has responded to this package request and has indicated to the visitor that the package is no longer available.

Rejected: the request originator has rejected the offer made in the package quotation.

Accepted: The visitor has accepted the offer made in the quotation by an agent. Each agent has, for example, a 48 hour period to respond to each package request before the system starts to send email reminders that they have not responded to the customer within an agreed timescale. The reminder is also sent to the system administrator informing them that the visitor is waiting for more than the advertised 48 hours to receive his/her package quote from the agent VII. Building a Package Quotation Once a package request has been submitted by a site visitor, the agent is informed via email that a new request for a package quotation has been inserted in their requests queue. By logging on to PMS 112, the agent navigates to the package requests section and clicks on the "Respond" link located next to a request they wish to respond to.

At this point, package quotation form is displayed to the agent. From this form, the agent is able to view the original package quotation request as well as the quotation response form. In this form, the agent can:

1. Specify whether a package request is available
2. Specify flight details of the package such as outbound/return journey airline, flight number, class of travel, additional comments, date of outbound journey, date of return journey, etc.
3. Specify accommodation details of this package such as hotel name, hotel location, room type, hotel amenities, additional information on hotel, whether airport transfer is included, etc.
4. Specify price per adult/child/infant
5. Specify the duration/cost of any additional components that the visitor has requested that are not part of the original package
6. Specify additional components the agent wishes to cross-sell or up sell to the visitor which are not part of the original package.
7. Provide additional information to the visitor for any part of the package The system then calculates the total amount for this quotation based on pricing specified by the agent for each of the sections that make up the quotation form, such as flights/accommodation/components.

Once this form is submitted by the agent, the system sends an email back to the visitor informing him/her that their request has been responded to with a quotation, changes the request status to "Waiting for customer," and informs the system administrator that the agent has responded to a visitor's request with a quotation.

As part of the email sent to him/her, the system indicates to the visitor that they need to logon to a respective site and click on "my Bookings" where they will be able to see the package quotation generated by the agent based on their request.

Once the visitor opens the package quotation, he/she is able to:

1. View their original request
2. View the package quotation (response)
3. Accept the package quotation
4. Reject the package quotation
5. Provide additional feedback to the agent On package quotation acceptance/rejection, the system performs the following tasks:

1. Notifies the agent of the visitor's response via email
2. Notifies the system administrator of the visitor's response
3. Changes the status of the request from "Waiting for customer" to either "Accepted" or "Rejected".

Thus, the PQS allows creation of a "presentation grid" that lists multiple packages by website. This is useful because different sites target different customer groups. For instance, website 1 may be targeted to the B2C market (business to consumer), while websites 2 and 3 may be targeted to the B2B (business to business) market. Once a package is built (and can include such things as cost, currency, origin, destination, dates available, etc.), it can then be placed on the selected websites:

| Site | Package | cost |
| --- | --- | --- |
| Website 1 | Dubai-NY 1 | $4700 |
| Website 1 | Kuwait-NY 1 | $2700 |
| Website 2 | Dubai-NY 1 | $4900 |
| Website 3 | Dubai-NY 2 | $4500 |

With a grid such as shown above, the creator of the package can make different packages available to the travel agents based on, among other things, the targeted market. Note that in this example, website 1 (e.g., www.myTravelChannel.com) has deeper discounts than website 2 for the same package (for instance, due to volume, or due to the fact that it is willing to cut its commissions). Website 3 has a package with the same origin and destination, but may have more restrictions (not shown in this grid). Website 1 also has a Kuwait-NY package, which is different from the Dubai-NY 1 package only in the flight information. This permits the travel agent to quickly build the Dubai-NY package by having the passenger fly through Kuwait, assuming this makes financial sense and the passenger is willing to make an extra stop.

VIII. Discounter

In order to provide tactical offers to the site visitors, system administrators have the ability to discount flight routes on the site by a certain amount, expressed for example, in percentage value.

By using the Discounter 117, the system administrator is able to create a discounted route. To create this route, the system administrator needs to enter the following:

1. Dates during which the discounting is applied (From-To)
2. Origin Point from which to discount fares (City Code)
3. Destination Point to which to discount fares (Country Code)
4. Discount which airline(s)
5. Applicable to Private Fares
6. Applicable to GDS (Published) Fares
7. Percent by which to discount fares With this option, the system administrator is able to create a discount as follows, for example: discount all private and published fares out of Dubai to Great Britain by 20% on (for example) all Emirates, British Airways and Lufthansa flights between first of January 2003 and 1st of March 2003.

IX. myFareWatcher

As a value added service to site visitors, myFareWatcher 124 provides information gathered across site(s) on seat availability and flight fares based on date range, price and tolerance limit.

Airlines publish different fares for different markets to the GDSs for different dates. A typical scenario is that if someone wanted to travel from Dubai to London on 13th of May and return on 19th of May, they would get a fare of $300. However, if they were to travel on 12th of May and return on 20th of May, they would get a lower fare. This is due to airlines publishing different fares that include a certain set of rules that govern their amounts. These rules include seasons, distressed inventory, tactical offers, stay duration, etc.

myFareWatcher 124 includes a robot program 133 that is started by the user in order to periodically query the relevant databases to either search for lower fares, or to search for availability if a particular flight desired by the consumer was unavailable during the initial search. The robot runs in the background, for example, once a day at midnight. The consumer can specify the budget and the flexibility in the budget (for example, up to 30% higher than the original fare offered to him if he wants a different flight).

Phrased another way, myFareWatcher 124 is an application that allows collecting MIS data relevant to flight searches conducted on myTravelChannel.com 110 (and any number of other applications). Collected data is then analyzed and stored for later retrieval, and can then be used as:

1. An information tool for the users who wish to see what fares are available on certain sectors on various dates, so they can base their trip planning around the best fare. Users are informed of best fares via either (a) email or (b) as part of search results. Users additionally can specify criteria by which they will be informed of great deals. (i.e., if the user chooses to be alerted when someone finds a fare from DXB to LHR for $400 or less, only then will they be notified).

2. An information tool for the business owners that helps them analyze most popular routes for air segments which then helps the business to (a) better price their products and (b) build tactical offers that match the market demand.

With myFareWatcher 124, the customer is provided with alternative dates on which the fares for the same travel sector might be lower. This is achieved with myFareWatcher 124 application, which monitors and stores all searches conducted on the site, their result and potential saving.

For example, myFareWatcher 124 would record a search made by Traveler 1 which originated from Dubai and was going to London on 13th of May with a return date on 19th of May. It would record a lowest price of $300. Before displaying the search result to the visitor, myFareWatcher 124 checks the database for any previously recorded searches attempted for the same sector with a lower fare found. If myFareWatcher 124 finds a stored fare that is lower than $300 (for example, $200), it will display a notification to the visitor above the search results with an indication that if the visitor changes their travel dates to those specified in a previously recorded search executed earlier by a different user, they might have a potential saving of $100 (provided that the seats are still available, which the user can check by clicking on "check availability" option).

In addition to the built-in display of myFareWatcher 124 as part of the search results, myFareWatcher 124 also enables the user to register and create email trigger criteria. By specifying in myFareWatcher 124 the route, trip type (one-way/return), fare and tolerance, the visitor will be in a position to receive an email as soon as someone finds a fare on the system that matches their criteria. For example, Traveler 3 registers with myFareWatcher 124 and specifies Dubai—London return trip for $200 with 10% tolerance as their email trigger. When myFareWatcher 124 records a search that matches that criteria, it will automatically send an email to that visitor informing them of dates for which they can check the availability on the site in order to get their desired fare. With myFareWatcher 124, the solution will be searching for best fares on behalf of the users, even when the users are not.

An attractive feature of the solution is that all the searches done by all the consumers can be stored in a local database (e.g., the myFareWatcher database 161). Thus, there is less need to constantly "ping" the GDS database 160, and prior searches by other customers can be reused. This is useful when a consumer specifies that in addition to a flight from origin A to destination B, and leaving on date X, returning on date Y, the consumer has some flexibility as to, for example, travel times, or travel dates. myFareWatcher 124 can search its own logs or other queries by other consumers, and provide the customer with additional options that may be cheaper. This has particular applicability to the leisure travel market where many consumers are willing to substantially change their itinerary in order to save money.

Additionally, myFareWatcher 124 can help offer the consumer other travel dates and other fares, if the particular fare sought by the consumer is sold out.

If the consumer does not confirm his purchase of the reserved booking within 48 hours, that booking is canceled.

myTravelChannel.com 110 also allows for reducing the commission, and passing on the savings to the consumer. Frequently, the reduction in the commission may be made up through volume.

X. Deposit Model and Cross Sell

Together with the PMS 112, an intelligent way of cross selling products from one section of the website to another can use the Deposit Model and Cross Sell approach. In addition, the Deposit model allows the customer to pay only 10% (or some other specified percentage) of the total ticket value online, and settle the remaining amount with the agent at a later time.

With the Discounter 117, a business can tactically discount routes rather than just individual flights. It is flexible enough to allow the business to specify the discounting of either/or/and any of the following 1. Airline specific
2. Route specific
3. Class specific
4. Fare type specific (e.g., Private vs. Published vs. All)
5. Origin point
6. Destination point In addition to public fares available through the GDS, such as Galileo GDS 207, there are also private fares available from Galileo GDS 207 (and other GDSs). The private fares may be, for example, corporate discounts from a particular airline to a particular corporation, or any other separate deals made between a provider (such as a hotel, an airline, a car rental company etc. and an organization) usually a business, or a corporation, etc. myTravelChannel.com 110 can compare its own private fares with the private fares available from Galileo GDS 207, to show the lowest fare to the consumer.

In conventional websites, after conducting a search of the available fares, the consumer sees a number of fares, including some relatively low fares, many of which are not available to be booked. In other words, these are, in effect, phantom fares, because if a consumer were to try to actually book them, he would be either told that that fare is not available, or be redirected to a higher fare. myTravelChannel.com 110 provides the consumer only those fares that are actually available. myTravelChannel.com 110 can also, optionally, show the consumer other fares that are within 45% or some other designated percentage of the lowest fare. This is normally done with every search, without the need for consumer to make additional requests on the website. Thus, the process of booking a flight, from the consumer's perspective, involves only the following steps:

1. search
2. review results
3. book the flight
4. pay to reserve the flight.

XI. Deposit model

Instead of asking for the full fare in order to book the flight, myTravelChannel.com 110 can also (or instead) ask for a certain percentage of the fare in order to book the flight, for example, 10% or 15%. This is tantamount to a cancellation fee should the consumer ultimately decide not to buy the ticket. Until the consumer actually pays to book the fare, no booking number is created. Thus, because the consumer's credit card is debited before the flight is booked, there is no danger that, in between looking on the screen to see which fares are available and actually booking a particular fare, that booking will disappear or will become unavailable.

Thus, there is no need for the airline to hold the inventory of "booked fares" for 30 minutes or 45 minutes, with the risk that a particular "booked"seat will not actually be purchased. Additionally, there is only a need to pay credit card and other charges on the booking amount (10% or 15%), while the commissions are based on the full amount paid for the ticket by the customer. This saves substantial amounts and third-party fees.

It is worth noting that in some cases, extending the stay at the destination by one day can substantially lower the price of the ticket. For example purchasing the ticket seven days in advance, with a stay at the destination of at least seven days can be considerably cheaper than purchasing the ticket six days in advance for a six day stay. Thus, with the proper specification of the flexibility of the travel dates by the customer, myFareWatcher 124 can reuse the searches by other customers to offer additional low cost options to the consumer.

With the above in mind, the process of booking various items, such as cruises, flights, hotels, etc., will be explained below with reference to FIGS. 3-8.

XII. Booking Cruises

The cruises module, which is part of the myTravel Channel application 120, includes ASPX pages that are used to display the flow for Cruises section of myTravelChannel. This section uses the Business Logic Layer 102 to call a package in the PMS 112 that have been tagged as a Cruise Package and follows the same flow in order to book cruises as does the Packages section.

Figure 3:
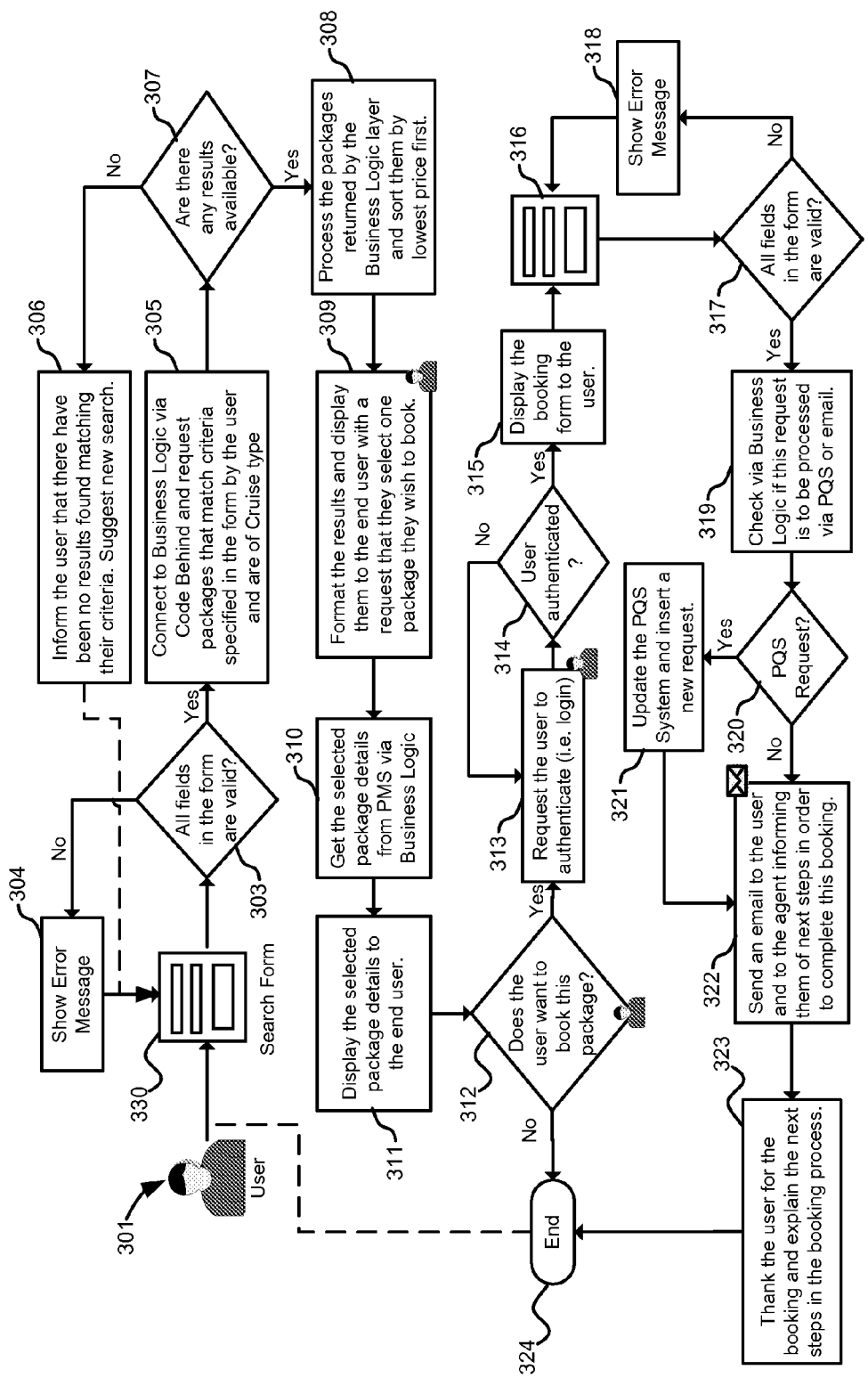
FIG. 3 shows the process flow for booking cruises in one embodiment of the present invention.

The booking flow is illustrated in FIG. 3. As shown in FIG. 3, the user 301 is shown a search form 330 for booking a cruise package, which he then fills out. If all the fields in the form 330 are completed validly (step 303), then the process proceeds to connect to the Business Logic Layer 102 using the Code Behind, so as to request packages that match the criteria specified by the user (step 305). If the search form 330 is not completed in a valid manner, the user 301 is shown an error message (step 304), and the search form 330 is redisplayed.

After step 305, if there are results available (step 307), the process proceeds to processing the packages returned by the Business Logic Layer 120, sorting them, for example, by the lowest price first (step 308). If no results are available, the user 301 is informed that no results matching their criteria have been found, and a new search is suggested (step 306). The search form 330 is then redisplayed to the user.

After step 308, once the packages returned by the Business Logic Layer 102 are processed, the results are formatted and displayed to the user 301, with the requests that the user 301 select one of the packages (step 309). Selected package details are then received from the PMS using the Business Logic Layer 102 (step 310). The selected package details are displayed to the user 301 (step 311). The user 301 is then asked if he wishes to book this package (step 312). If he does not, then the process ends (step 324). If the user 301 does want to book the package, then the user 301 is requested to authenticate himself (step 313). If the user 301 is not authenticated (step 314), then the user 301 is requested again to authenticate himself (returning to step 313). If the user 301 has validly authenticated himself, then the booking form 316 is displayed to the user 301 (step 315). If not all the fields in the form 316 are valid (step 317) then an error message is shown (step 318), again displaying the form 316. If all the fields in the form 316 are valid, then the process checks, using the Business Logic layer 102, if this request is to be processed using either PQS or email (step 319). If the request needs to be processed as a PQS request (step 320), then the PQS system is updated, and a new request is inserted (step 321). If the request is not processed as a PQS request, then an email is sent to the user 301 and to the travel agent, informing them of the next steps they need to take to complete this booking (step 322). The user 301 is then thanked for the booking, and the next steps are explained to the user 301 (step 323). The process then terminates at step 324.

XIII. Booking Events

This section includes ASPX pages and Code Behind that connects to the Business Logic & Data Access Layer 102 and provides a filtered search of packages in the Product Management System 112 that have been input as Events. The booking flow is illustrated in FIG. 4.

Figure 4:
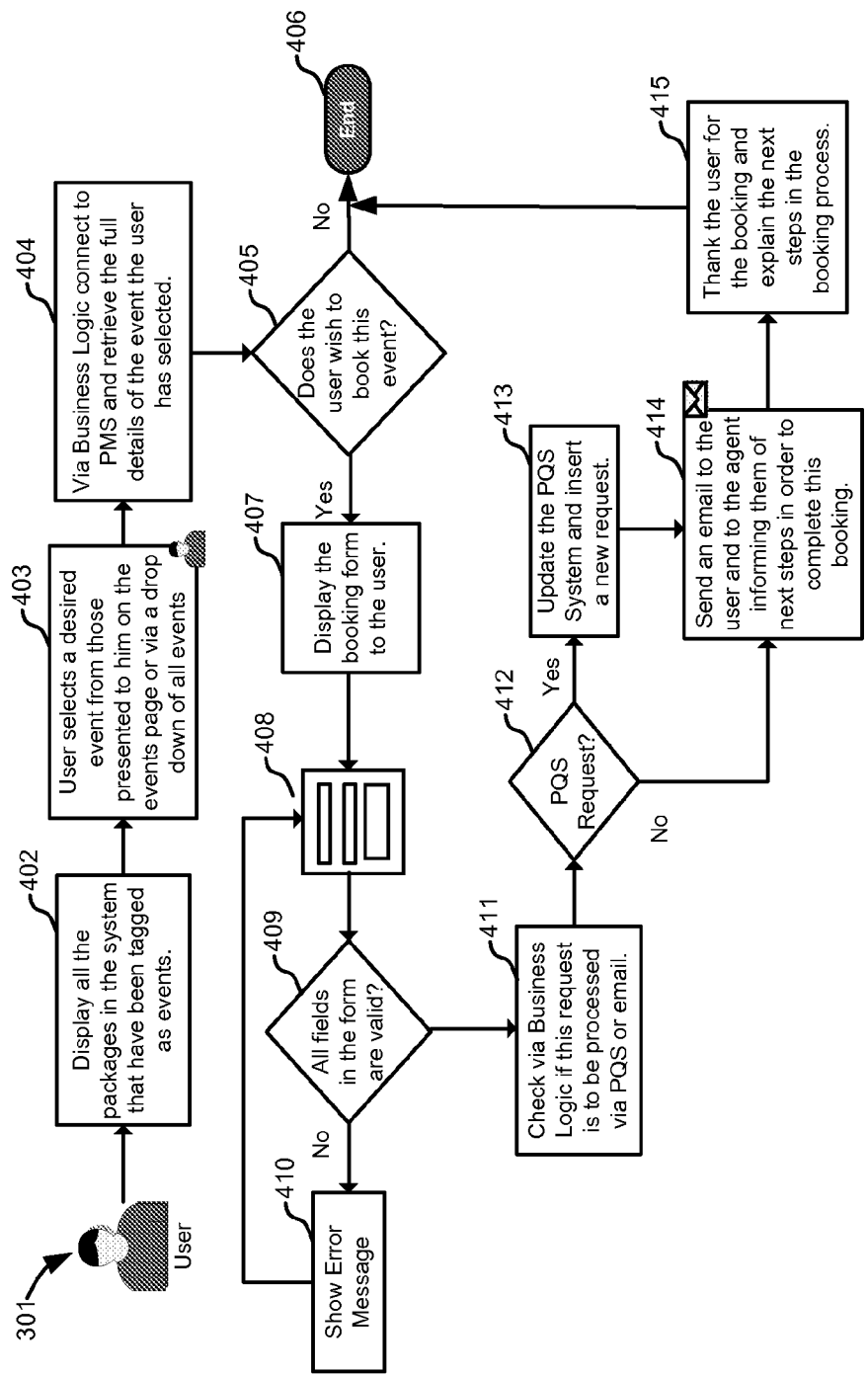
FIG. 4 shows the process of booking events in one embodiment of the present invention.

As shown in FIG. 4, in step 402, all the packages in the system that have been tagged as "events" are displayed to the user 301. In step 403, the user 301 selects a desired event out of the events that were presented to him, either on a page or using a drop down menu of all the events (step 403). In step 404, the system connects to the PMS 112 using Business Logic Layer 102, and retrieves all the details of the events selected by the user 301. If the user 301 does not wish to book this event (step 405), the process ends (step 406). If the user 301 does wish to book this event, in step 407, a booking form 408 is displayed to the user 301. The process then checks if all the fields in the form 408 have been validly completed (step 409). If they have not been validly completed, an error message is displayed (step 410), and the form 408 is redisplayed to the user 301. If the fields in the form 408 are validly completed, the process checks, using the Business Logic Layer 102, if this request needs to be processed using PQS or using email (step 411). If the request is a PQS request (step 412), the PQS system is updated, and a new request is inserted (step 413). The process then proceeds to step 414, sending an email to the user 301 and to the travel agent informing them of the next steps to be followed to complete this booking (step 414). If the request is not a PQS request in step 412, the process proceeds directly to step 414. In step 415, the user 301 is thanked for the booking, and the next steps are explained (step 415). The process then terminates at step 406.

As an alternative, the solution can interface to ViaTour (a provider of package information and booking information) using an XML feed, see, e.g., http://www.viatour.com.au/.

XIV. Booking Hotels

This section contains ASPX pages and Code Behind that connect to the Business Logic Layer 102 and then via XML to World Choice Travel/USA Hotel Guide inventory system. The booking flow is illustrated in FIG. 5.

Figure 5:
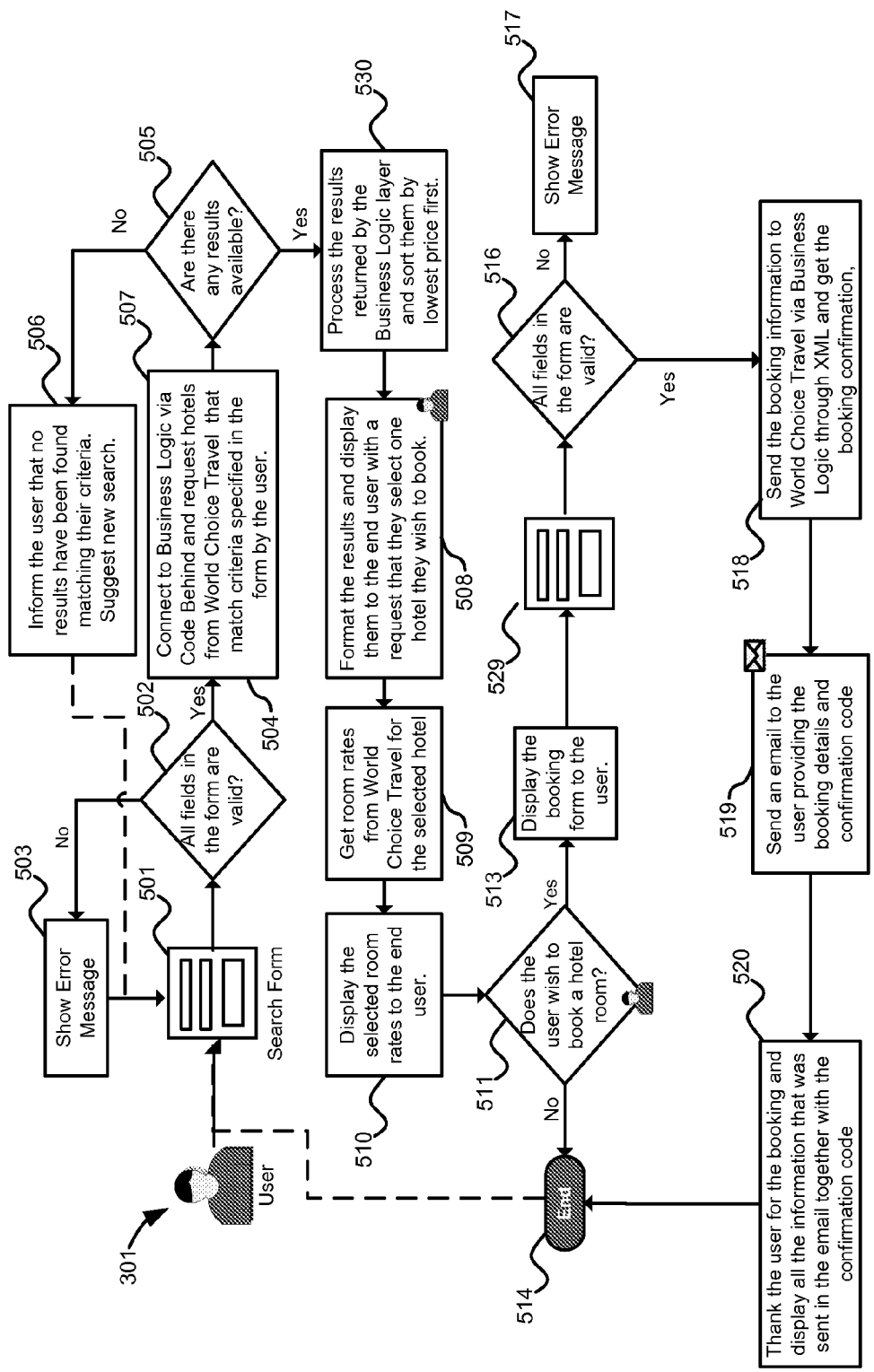
FIG. 5 shows the process of booking hotels in one embodiment of the present invention.

As shown in FIG. 5, to book a hotel, the user 301 is shown a search form 501. If all the fields in the form 501 are validly completed by the user (step 502), then the process proceeds to connect to the Business Logic Layer 102 using the Code Behind, and requests the hotels from, for example, World Choice Travel 162, that match the criteria specified in the form 501 by the user 301 (step 507). If the form 501 is not validly filled out, an error message is shown (step 503), and the form of 501 is redisplayed.

After step 507, if there are no results available (step 505), the process proceeds to inform the user 301 that no results have been found that match the user's criteria, and a new search can be suggested (step 506). The process can then return to display a new form 501. If, in step 505, results are available, the results are processed and sorted by, for example, the lowest price (step 530). The result will then be formatted and displayed to the user 301, requesting that he select one of them (step 508).

Room rates are then received from World Choice Travel 162 for the selected hotel (step 509). The selected room rates are then displayed to the user 301 (step 510). The user 301 is then asked if he wishes to book a hotel room (step 511). If he does not, the process ends (step 514). If he does, then a booking form 529 is displayed to the user 301 (step 513). The process then checks if all the fields in the form 529 have been correctly filled out (step 516). If they have not, then an error message is shown (step 517) and the form 529 is redisplayed. If the fields in the form 529 have been validly filled out, then the process proceeds to send the booking information to World Choice Travel using the Business Logic Layer 102, through protocols such as XML, and gets a booking confirmation (step 518). An email is then sent to the user 301, providing him with the booking details and the confirmation code (step 519). The user 301 is then thanked for the booking, and all the information that was sent in the email is displayed, including a confirmation code (step 520). The process then ends at step 514.

XV. Booking Packages

This section contains ASPX pages and Code Behind that connects to Business Logic & Data Access Layer 102 and then to the SQL Database 161 and Product Management System 112 to retrieve and book packages in the system that match the user's search criteria. The booking flow is illustrated in FIG. 8.

The packages section has a user front-end, which is part of the Presentation and Application Layer 101, that allows the user to search for packages that match his/her search criteria. The back-end connects to the Product Management System 112 and Package Quotation System 132 to manipulate data.

Figure 8:
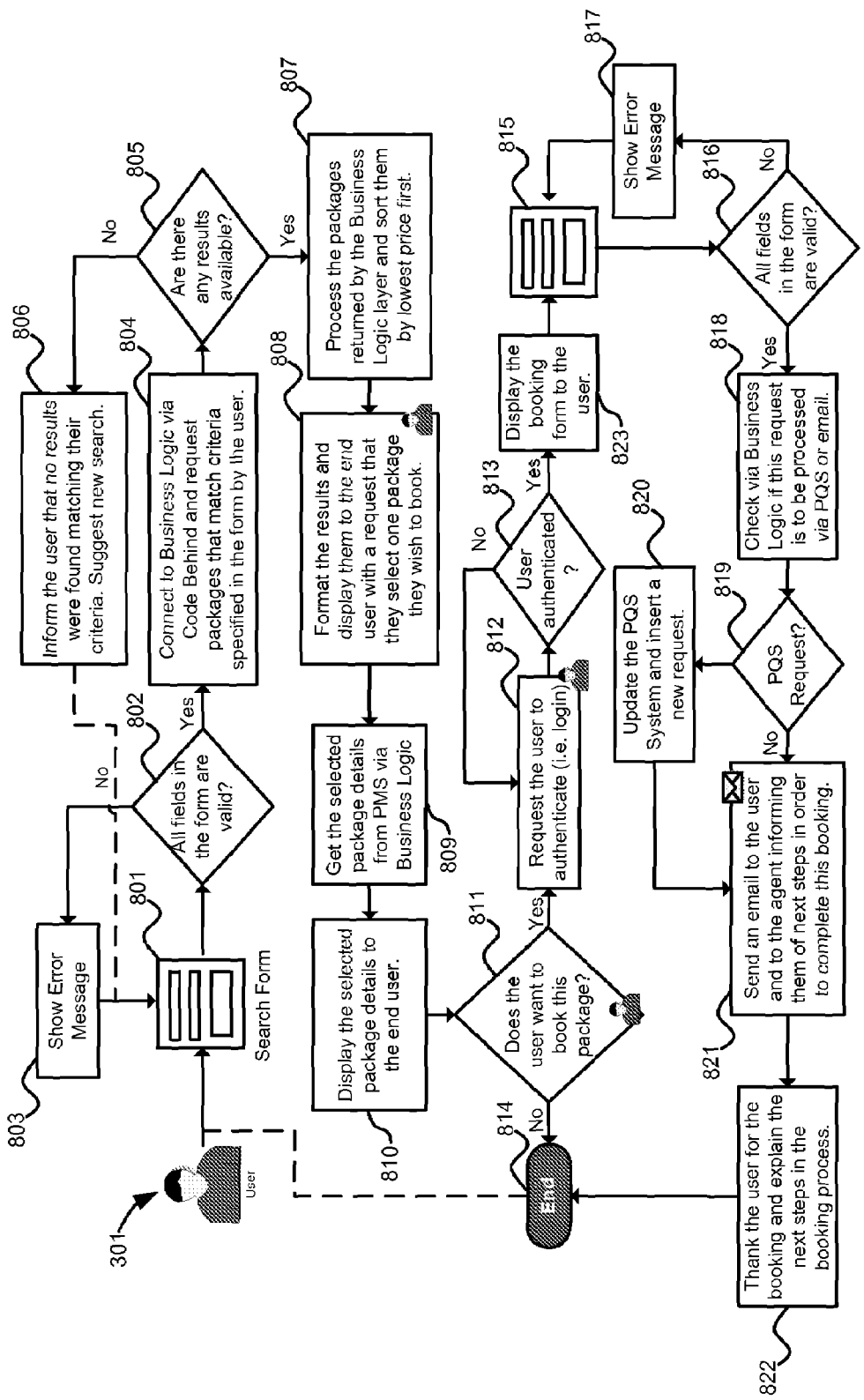
FIG. 8 shows the process of booking packages in one embodiment of the present invention.

As shown in FIG. 8, to book a package, the user 301 is shown a search form 801. Once the user 301 completes the form 801, the system checks if the fields in the form have been validly completed (step 802). If they have not been validly completed, an error message is shown (step 803), and the form 801 is redisplayed. If the fields have been validly completed, then the system connects to the Business Logic Layer 102 using the Code Behind, to request packages that match criteria that the user 301 specified (step 804). If there are no search results available (step 805), then the user 301 is informed of that fact, and a new search is suggested (step 806). The form 801 is then again displayed to the user 301. If results are available, then the packages that are returned by the Business Logic Layer 102 are processed and sorted, by the lowest price first (step 807). The results are formatted and displayed to the user 301, with a request that he select one package for booking (step 808).

Details for the selected package are received from the PMS using the Business Logic Layer 102 (step 809). The details of the selected package are displayed to the user 301 (step 810). If the user 301 does not wish to book this package (step 811), the process terminates (step 814). If the user 301 does wish to book the package, he is requested to authenticate himself (step 812). If the user 301 is not then authenticated (step 813), he is again requested to authenticate himself (step 812). If the authentication is valid, a booking form 815 is displayed to the user 301 (step 823).

The user 301 then fills out the form 815, and the process checks whether the user 301 filled all the fields in the form validly (step 816). If not, an error message is shown (step 817), and the form 815 is redisplayed to the user 301. If the fields in the form 815 have been filled out validly, the process checks, using the Business Logic Layer 102, if this request needs to be processed using the PQS or using email (step 818). If this is a PQS request (step 819), the PQS system is updated, and a new request is inserted (step 820). An email is then sent to the user 301 and to the travel agent informing them of the next steps they need to take in order to complete the booking (step 821). If this is not a PQS request in step 819, the process proceeds directly to step 821. The user 301 is then thanked for the booking, and the next steps in the process are explained to the user 301 (step 822). The process then terminates in step 814.

XVI. Booking Flights

This section contains ASPX pages, ASCX controls and relevant Code Behind to connect to Business Logic & Data Access Layer 102, PMS 112, TrustMarque 163 and SQL Server 2000 database 161 in order to allow the user to book a flight, as shown in FIGS. 6 and 7A-7D.

Figure 6:
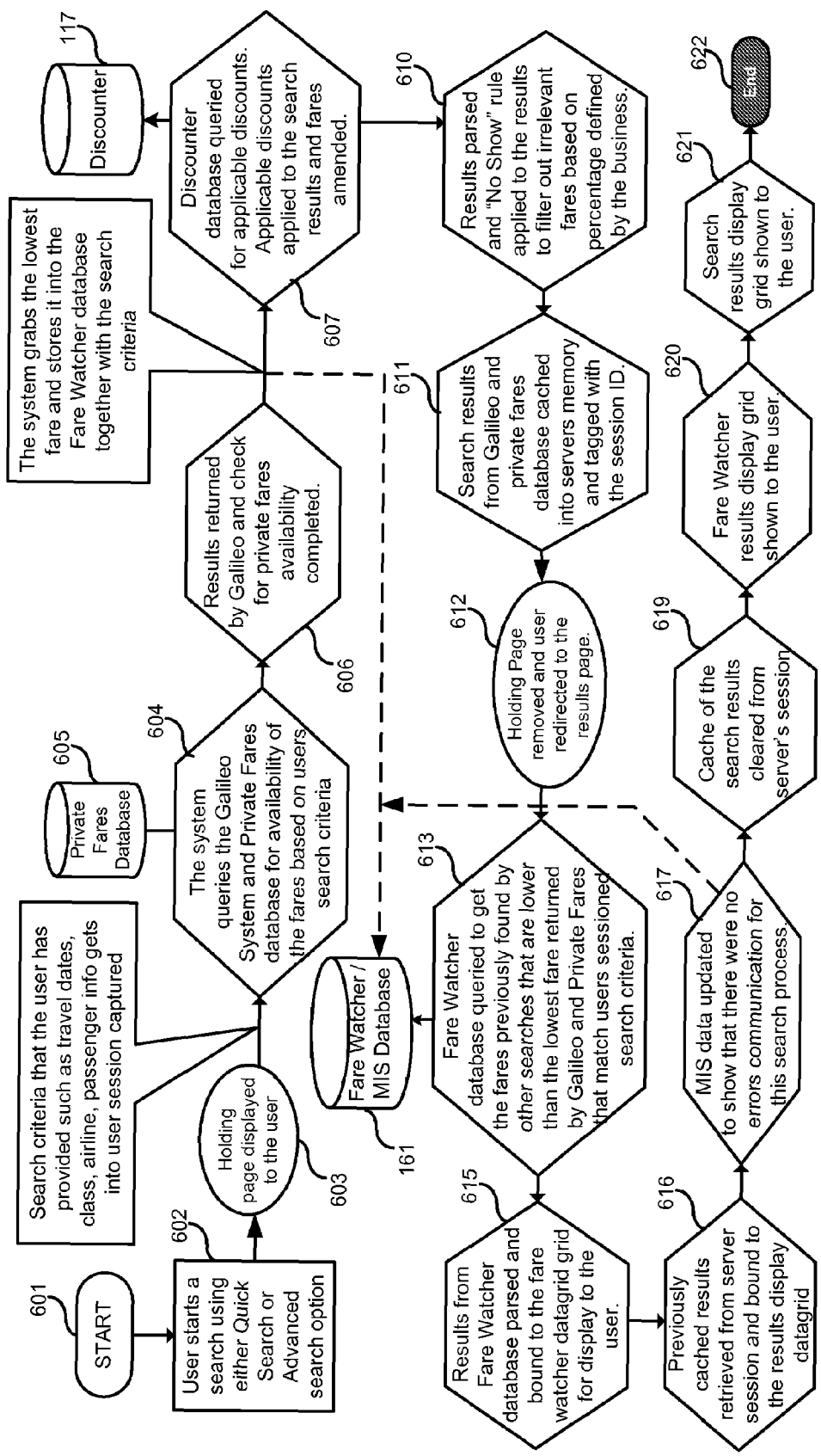
FIG. 6 shows the flight search process of the present invention.

As shown in FIG. 6, upon the start of the booking process (601), the user begins a search using either a quick search or an advanced search option (step 602, see also discussion below). A holding page is displayed to the user (step 603). Here, the user has the option to provide search criteria, such as travel dates, airline, passenger information, etc., and this information is captured. The system then queries the Galileo GDS 207 database 160 and a Private Fares database 605 for availability of the fares, based on the criteria entered by the user (step 604). The results are returned by the Galileo GDS 207 database 160 and the Private Fares database 605 (step 606). Here, the system has an opportunity to "grab" the lowest fare, and store it in the database 161, together with a search criteria.

The discounter 117 is then queried for applicable discounts (step 607). These discounts are applied to the search results and to the fares, as amended by the discount using the information from the discounter 117. The results are then parsed, and a "no show" rule is applied to the results, to filter out irrelevant fares, based on a percentage defined by the system administrator (step 610). The search results from the Galileo GDS 207 database and the Private Fares database 605 are cached into a server memory, and are tagged with a session ID (step 611). The holding page is removed, and the user is redirected to a results page (step 612). The Fare Watcher database 225 (which may be stored on the SQL server 215) is queried for fares that have been previously found by other searches, where the fares are lower than the lowest fare returned by Galileo GDS 207 database 160 and the Private Fares database 605, such that these results match the criteria selected by the user 301 for this session (step 613). The results from the Fare Watcher database 225 are parsed down to the myFareWatcher data grid, prior to displaying the results to the user (step 615).

Results that have been previously cached are retrieved from the server, and are bound to the display data grid (step 616). Management and Information Systems (MIS) data (see database 164) is then updated to confirm that there was no communication error during the search process (step 617).

Search results of this session are then cleared from the cache (step 619). myFareWatcher results display grid are shown to the user 301 (step 620). Search results display grid are also shown to the user 301 (step 621). The process then ends at step 622.

Figure 7A:
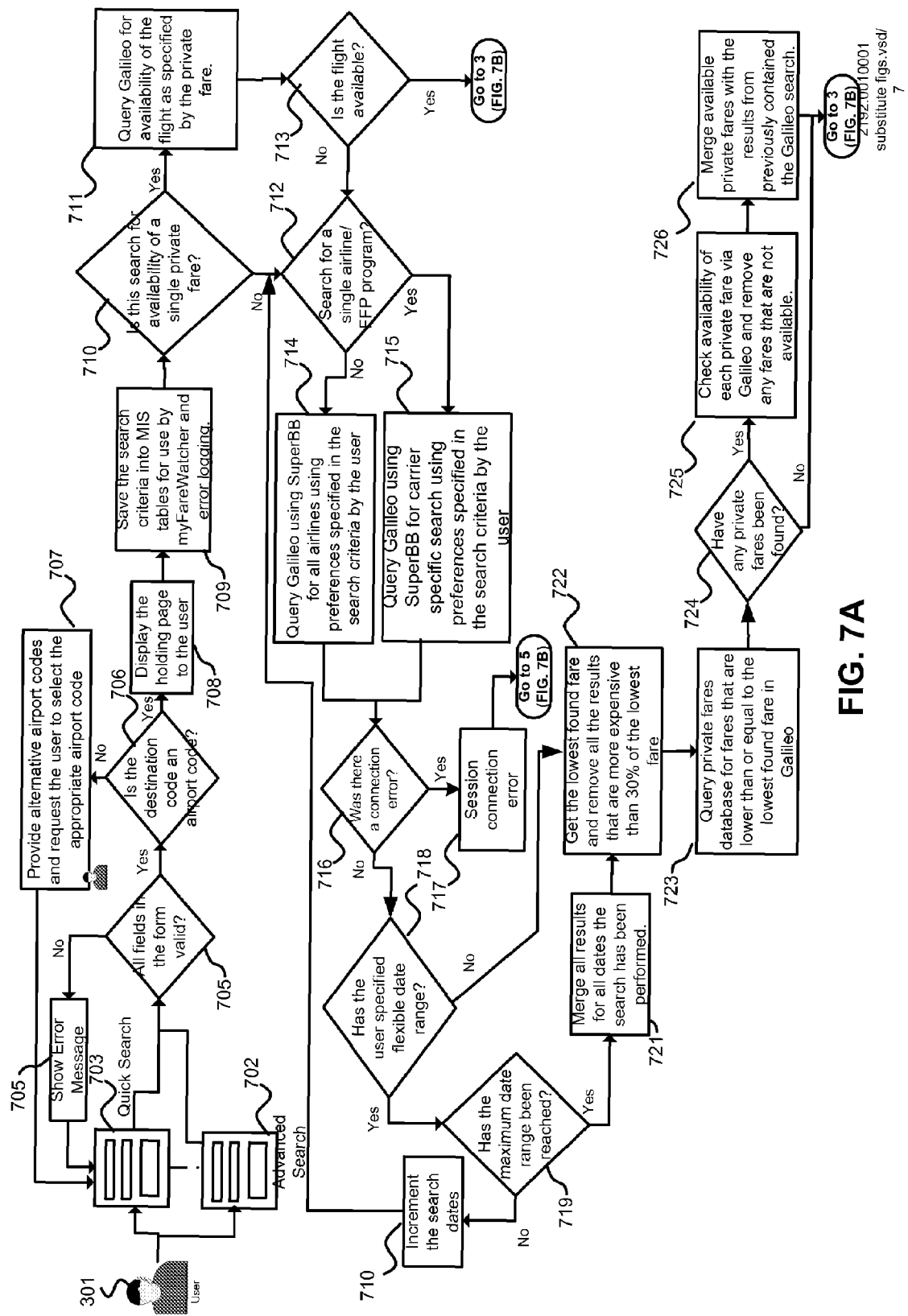
FIGS. 7A-7D show the process of booking flights in one embodiment of the present invention.
Figure 7B:
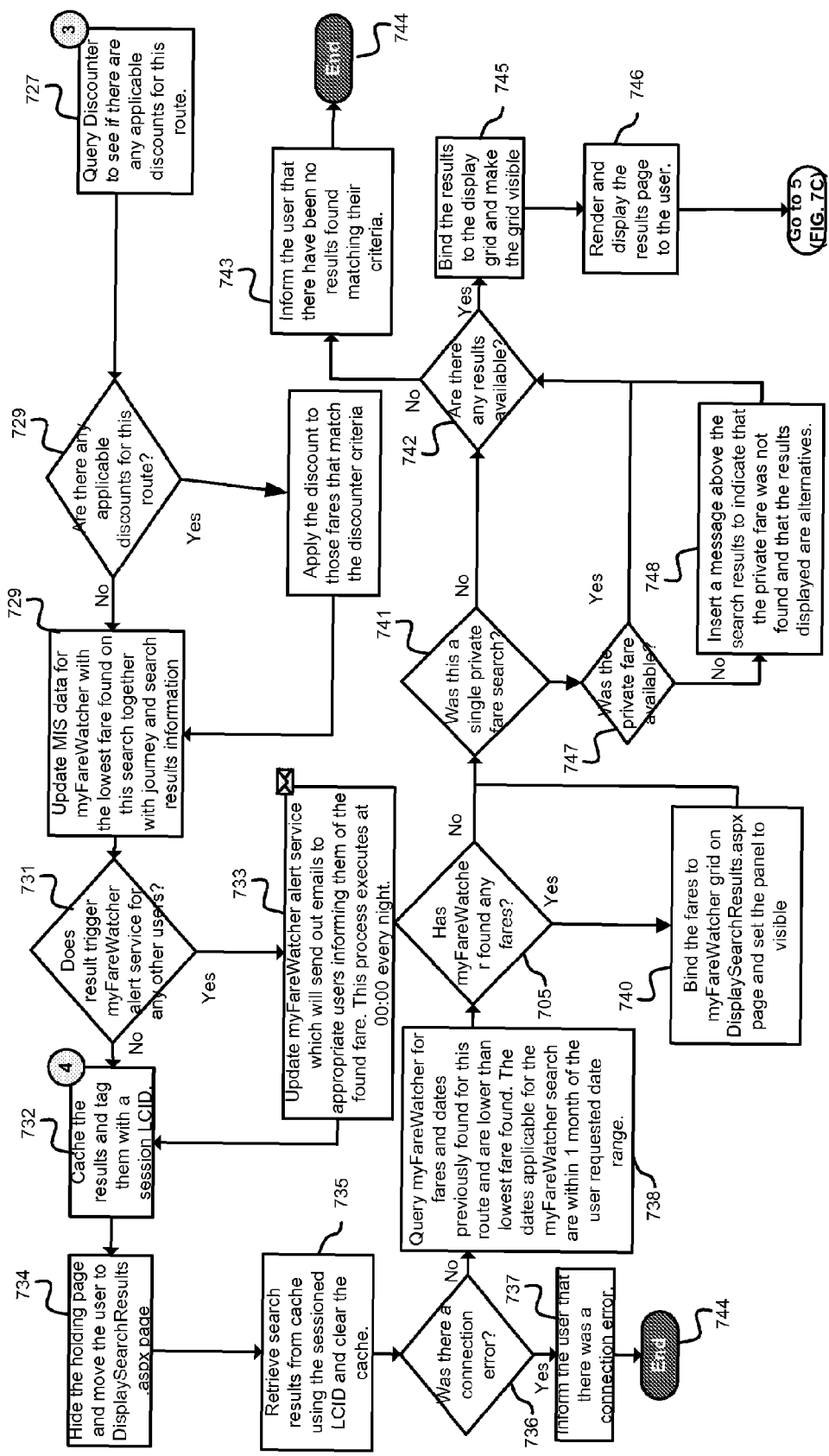
Figure 7C:
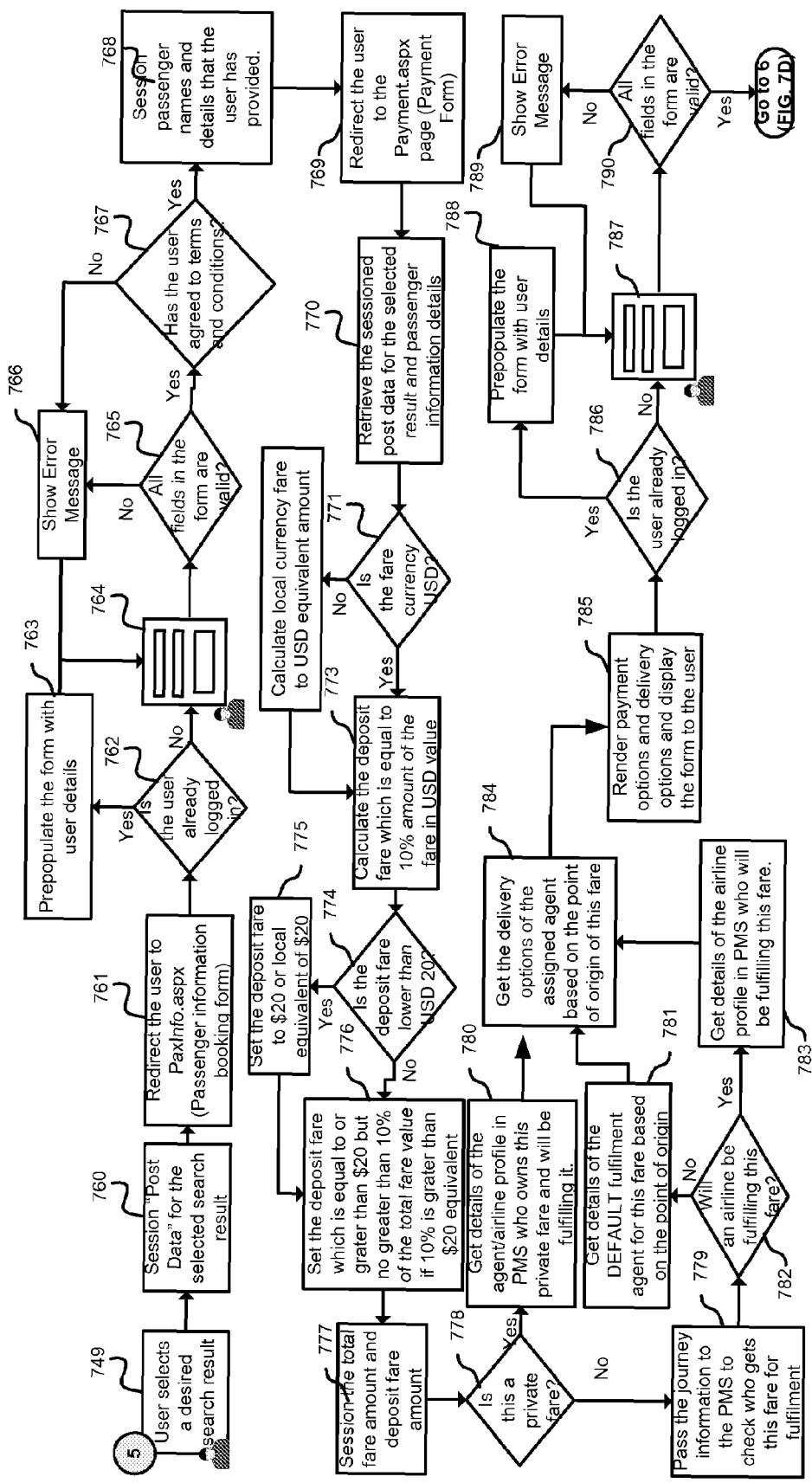
Figure 7D:
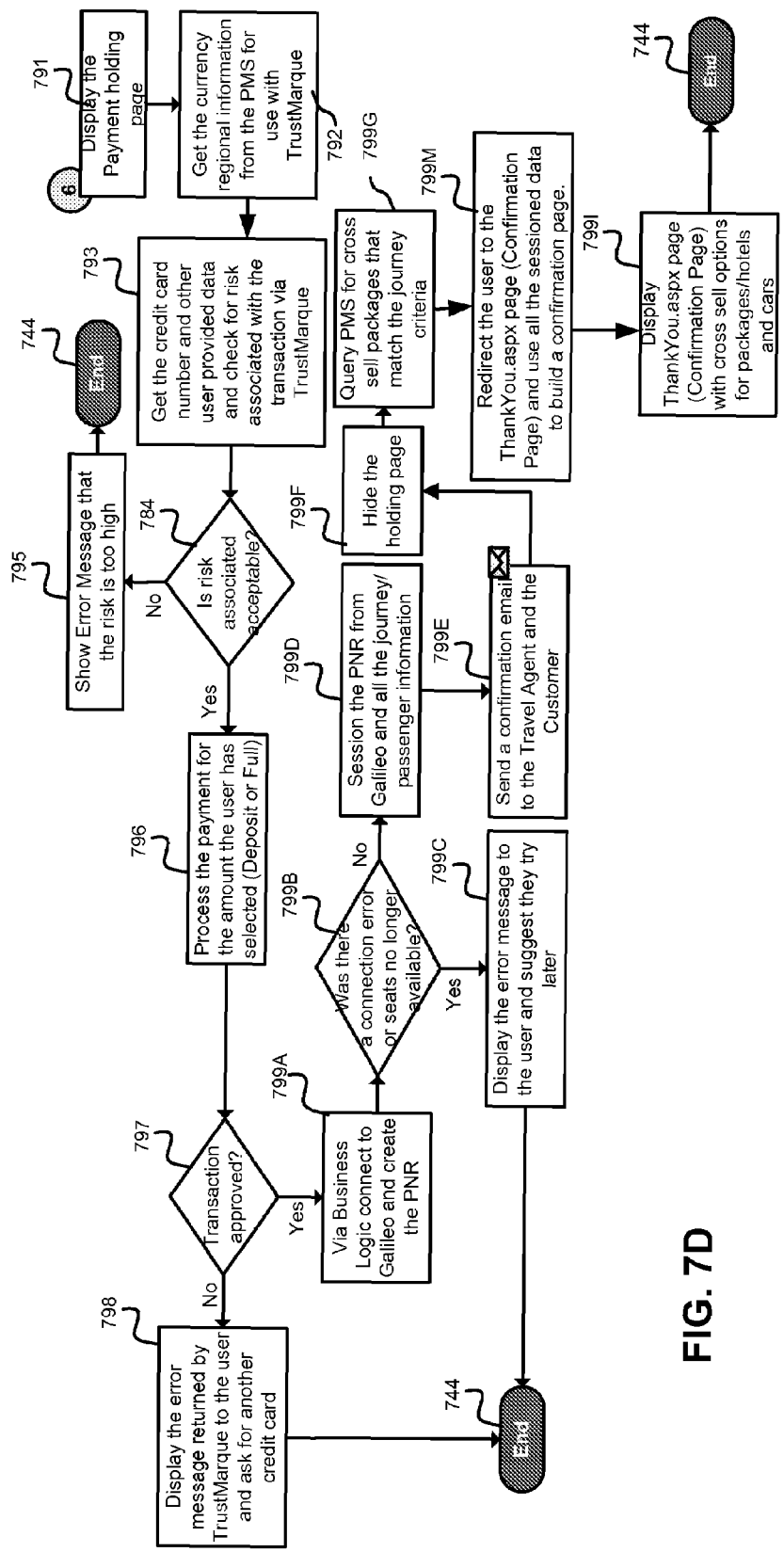

The process of booking a flight will be further described with reference to FIGS. 7A-7D, which represents a single flowchart. As shown in FIG. 7A, the user 301 is presented with two possible search forms, a Quick Search form 703, and an Advanced Search form 702. The system then checks if the user correctly filled out all the fields in the form 703 or 702 (step 705). If he has not, an error message is shown (step 704) and the appropriate form 703 or 702 is redisplayed. If he has correctly filled out all the fields in the form 703 or 702, the system then checks if the destination code in the form is an airport code (step 706). If it is not, then alternative airport codes are provided to the user, and the user is requested to select an appropriate airport code (step 707). The form 703 or 702 is then redisplayed to the user 301. If the destination code is an airport code, the holding page is displayed to the user 301 (step 708). The search criteria are then saved into MIS tables, for use by myFareWatcher 124, and for error logging (step 709).

In the next step, the system checks if this is a search for availability of a single private fare (step 710). If it is, then Galileo GDS 207 database 160 is queried for availability of the flight, as specified by the private fare (step 711). If the flight is available (step 713) then the discounter is queried to see if there are any applicable discounts (step 727). If it is not, then the system queries whether this is a search for a single airline or frequent flyer program (step 712). If it is not, then Galileo GDS 207 is questioned using Super BB (Super Best Buy) for all airlines, using preferences specified in the search criteria by the user 301 (step 714). If it is not, then Galileo GDS 207 is queried for a carrier specific search (step 715).

The system then checks if there were any connection errors (step 716). If there were not, the system proceeds to step 718, checking whether the user 301 has specified a flexible date range (step 717) (if there is a connection error in step 716, then the system indicates a section connection error), and results of the search are cached, and tagged with a session ID (step 732). If the user 301 has specified a flexible date range in step 718, then the system checks whether a maximum date range has been reached (step 719). If it has, then search dates in the database are incremented (step 720), and the process returns to step 712. If the maximum date range has not been reached, then all results for old dates, including the search just performed, are merged (step 721).

The system then proceeds to step 722, which gets the lowest found fare, and removes all results that are more expensive than a certain percentage of the lowest fare, for example, 30% more expensive (step 722). Also, in step 718, if the user has not specified a flexible range, the system proceeds directly to step 722.

Following step 722, the Private Fares database 165 is queried for fares that are lower than or equal to the lowest fare supplied by Galileo GDS 207 (step 723). The system then checks if any private fares have been found that match the criteria (step 724). If yes, availability of the private fare is checked through Galileo GDS 207, and any fares that are unavailable are removed (step 725). Available private fares are merged with the results from previous searches of Galileo GDS 207 (step 726). The discounter 117 is then queried as described in step 727 above. If, in step 724, no private fares have been found, the system proceeds directly to step 727.

Following step 727, the system checks if there are any applicable discounts for this route (step 728). If there are, then the discounts are applied to the fares that match the discounters criteria (step 730). If there are no applicable discounts, then myFareWatcher database 161 is updated with the lowest fare found on the search, together with the journey information (step 729). The system then checks whether the result triggers an alert service (robot 133) of myFareWatcher for other users (step 729). If it does not come up then the system proceeds to step 732, caching and tagging the results. If it does, then the myFareWatcher alert service (robot 133) is updated, which will result in the sending out of emails to appropriate users informing them of the found fare (step 733). This is typically done once a day, for example, at midnight. The system then proceeds to step 732, as described above.

Following the caching and tagging of the result in step 732, the holding page is hidden, and the user 301 is moved to a page that displays the search results (step 734). Search results are retrieved from the cache using the session ID and the cache is cleared (step 735), while the system then checks if there is a connection error (step 736). If yes, then the user 301 is informed that there was a connection error (step 737), and the process ends (step 744). Otherwise, the myFareWatcher database 161 is queried for fares and dates previously found for this route, and which are lower than the lowest found fare. Normally, the dates applicable for the fare search are within one month of the user requested date range (step 738). The system then checks if any appropriate fares are found in the myFareWatcher database 161 (step 739). If yes, then the fares are bound to the myFareWatcher grid on a form that displays search results, and the panel is set to "visible" (step 740). The system then checks if this is a single private fare search (step 741). In step 739 if no fares have been found, then the system proceeds directly to step 741.

If, in step 741, this was a single private fare search, then the system checks if the private fare is available (step 747). If not, then a message is added above the search result indicating that the private fare was not found, and that the displayed results represent alternatives (step 748). The system then checks if there are any available results (step 742). In step 747, if the private fares are available, then the system proceeds directly to step 742. If no results are available in step 742, then the user is informed accordingly, and the process terminates (step 744). If there are available results in step 742, then the results are bound to the display grid, and the grid is made visible (step 745). The results are then rendered and displayed as a web page to the user 301 (step 746).

The user 301 then selects a desired search result (step 749). The result is then designated as the session "post data" (step 760). The user 301 is then redirected to a passenger information booking form (step 761). The system checks if the user 301 is already logged in (step 762). If he is not, then a login form 764 is displayed. If he is already logged in, then the form 764 is repopulated with user details (step 763).

Once the data is in the form 764, the system checks if all the fields in the form 764 have been validly completed (step 765). If all the fields have not been validly completed, then an error message is shown (step 766), and the form 764 is redisplayed. If all the fields have been validly completed, then the user is asked to agree to the terms and conditions (step 767). If he has not agreed, then an error messages (step 766) is displayed. If he has agreed, then the session continues with the passenger names and details provided by the user (step 768). The user is redirected to a payment page (step 769). The session post data for the selected result and passenger information is retrieved (step 770). The system then checks if the currency of the fare is in U.S. dollars (step 771). If not, then a local currency equivalent is calculated (step 772). If it is, then the process proceeds directly to calculating a deposit fare, which is equal to, for example, 10% of the amount of the fare (step 773).

The system then checks if the deposit fare is lower than a certain amount, for example, twenty dollars (step 774). If the amount is less than twenty dollars, then the deposit is set to twenty dollars (step 775). If it is not less than twenty dollars, then the deposit is set to some predetermined amount, for example, 10% of the value of the fare. The total fare amount and the deposit fare amount is then stored as the session amount (step 777). The system then checks if this is a private fare (step 778). If it is not a private fare, then the journey information is passed to the PMS to check which airline gets this fare for fulfillment (step 779).

Next, the system checks whether an airline will be fulfilling this fare (step 782). If yes, then the details of the airline profile are received from the PMS (step 783). The system then gets to delivery options of the assigned agent based on the point of origin of this fare (step 784). In step 778, if the fare is a private fare, then the details are received from the PMS 112 regarding the agent/airline profile, as well as who owns this private fare and who will be fulfilling it (step 780). The process then proceeds to step 784. In step 782, if an airline will not be fulfilling this fare, then the system gets the details of the default fulfillment agent for this fare, based on the point of origin (step 781), and then proceeds to step 784.

Following step 784, payment options and delivery options are displayed on the screen for the user (step 785). The system then checks if the user is logged in (step 786). If he is not, then log in form 787 is displayed. If he is logged in, then the form 787 is pre-populated with user details (step 788). Once the user fills out the form 787, the system checks if all the fields in the form are valid (step 790). If all the fields are not valid, then an error message is shown (step 789), and the form 787 is displayed again. If all the fields in form 787 are valid, then a payment holding page is displayed (step 791).

The system then gets the currency regional information from the PMS 112 for use with TrustMarque (step 792). Credit card number and other user data is then received and checked for risk associated with a transaction (step 793). The system then checks if the risk is acceptable (step 794). If the risk is not acceptable, then an error message is shown (step 795) and the process terminates (step 744). If the risk is acceptable, then the payment is processed for the amount that the user has selected (which may be either the deposit amount or the full amount) (step 796).

The system then verifies that the transaction has been approved (step 797). If the transaction has not been approved, then an error message returned by TrustMarque is displayed to the user, and another credit card number is requested (step 798). If the transaction is approved, then, using the Business Logic Layer 102, the system connects to Galileo GDS 207 and creates a PNR (step 799A). The system then checks if there was a connection error, or if seats are no longer available (step 799B). If either of those conditions are satisfied, then an error message is displayed to the user (step 799C), and the process terminates in step 744. If neither of those conditions are satisfied, then the system saves the PNR from Galileo GDS 207 and all the information related to the transaction (step 799D). A confirmation email is sent to the agent and the customer (step 799E). The holding page is then removed from the customer screen (step 799F). The PMS 112 is then queried for any opportunities to cross sell packages that match the journey criteria (step 799G). The user is then redirected to a "thank you" page (in other words a confirmation page), while all the data from this session is used to create the confirmation page (step 799H). The "thank you" page is displayed, with cross selling options for, e.g., packages, hotels, and cars (step 799I). The process then terminates at step 744.

The approach described above provides a number of benefits. For example, time to market of the software is reduced from two weeks to maximum of five days. Complete control over all technical environments is enabled. A modularized approach makes modifications easy to achieve. A componentized approach enables "plug and play" with different websites. Also, full first, second and third level support is available to all of the agents. Building custom solutions quickly is also, possible based on this approach, that would interface with the solution and provide additional functionality to the agents.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

What is claimed is:

1. A method of processing a travel-related package request from a customer comprising:
   receiving customer information regarding a travel related package, including a flight booking request from a customer;
   storing the customer information in a database;
   sending, from a package management system, a first agent notification to an agent via email, the notification including a link to a website, wherein the agent can access the package request details by navigating to the link;
   sending agent notifications to the agent if the agent fails to responds within a first predetermined period of time;
   displaying on the website the package request details to the agent;
   querying a Global Distribution System for a quotation, including querying a Private Fares database, wherein the Private Fares are offered by a particular airline to a particular travel agent;
   receiving via the website a response to the email from the agent;
   sending to the customer a first customer notification of the response from the agent;
   sending a second customer notification to the customer if the customer fails to responds within a second predetermined period of time;
   displaying to the customer a package quotation based on the response from the agent including only actually available fares to the customer based on the quotation from the Global Distribution System, but not any phantom fares;
   receiving a response from the customer indicating one of an acceptance or a rejection; and
   upon acceptance, sending an email to the agent with details of the customer acceptance.

2. The method of claim 1, wherein the first predetermined period of time is at least two days after sending the first agent notification.

3. The method of claim 1, wherein the second predetermined period of time is at least one day after sending to the customer the first customer notification of the response from the agent.

4. The method of claim 1, wherein the customer information includes any of customer email address, customer name, telephone number, budget, destination, origin, departure and return dates, preference of hotel type, preference of hotel room, preference of meal type, preference of flight type, flight class, number of passengers, and additional remarks.

5. The method of claim 1, wherein the package quotation includes any of budget, destination, origin, departure and return dates, preference of hotel type, preference of hotel room, preference of meal type, preference of flight type, flight class, number of passengers, and additional remarks.

6. A method of processing a travel-related request from a customer comprising:
   receiving customer information regarding a travel related package, including a flight booking request that includes flexible travel dates;
   storing the customer information in a local database;
   sending a first notification to an agent, wherein the agent can access package request details, and wherein the package request details are based on Private Fares that are offered by a particular airline to a particular travel agency;
   sending agent notifications to the agent if the agent does not respond within a first predetermined period of time;
   displaying to the agent the package request details;
   querying a Global Distribution System for a quotation, including querying a Private Fares database, wherein the Private Fares are offered by a particular airline to a particular travel agent;
   receiving and storing a response from the agent;
   notifying the customer if a flight is available at a fare within a range specified by the customer in the flight booking request;
   displaying to the customer a package quotation based on the approval of the package from the agent including only actually available fares to the customer based on the quotation from the Global Distribution System, but not any phantom fares;
   upon acceptance by the customer, notifying the agent of the acceptance; and
   removing the customer from an active search list.

7. The method of claim 6, wherein the first predetermined period of time is at least two days after sending the first agent notification to an agent.

8. The method of claim 6, wherein the second predetermined period of time is at least one day after displaying to the customer the package quotation based on the response from the agent.

9. The method of claim 6, wherein the customer information includes any of customer email address, customer name, telephone number, budget, destination, origin, departure and return dates, preference of hotel type, preference of hotel room, preference of meal type, preference of flight type, flight class, number of passengers, and additional remarks.

10. The method of claim 6, wherein the package quotation includes any of budget, destination, origin, departure and return dates, preference of hotel type, preference of hotel room, preference of meal type, preference of flight type, flight class, number of passengers, and additional remarks.

11. A system for processing a travel-related package request from a customer comprising:
   means for receiving customer information regarding a travel related package, including a flight booking request;
   means for storing in a database the customer information;
   means for sending, from a package management system, a first agent notification to an agent via email, the notification including a link to a website, wherein the agent can access package request details by navigating to the link;

means for sending to the agent agent notifications if the agent fails to respond within a first predetermined period of time;

means for displaying to the agent the package request details on the website;

means for querying a Global Distribution System for a quotation, including querying a Private Fares database, wherein the Private Fares are offered by a particular airline to a particular travel agent;

means for receiving from the agent, via the website, a response from the agent;

means for sending to the customer a first customer notification of the approval of the package from the agent;

means for sending to the customer a second customer notification if the customer fails to respond within a second predetermined period of time;

means for displaying to the customer a package quotation based on the response from the agent including only actually available fares to the customer based on the quotation from the Global Distribution System, but not any phantom fares; and means for notifying the agent of the acceptance by the customer.

12. The system of claim 11, wherein the first predetermined period of time is at least two days after sending the first agent notification to the agent.

13. The system of claim 11, wherein the second predetermined period of time is at least one day after sending the first customer notification to the customer of the response from the agent.

14. The system of claim 11, wherein the customer information includes any of customer email address, customer name, telephone number, budget, destination, origin, departure and return dates, preference of hotel type, preference of hotel room, preference of meal type, preference of flight type, flight class, number of passengers, and additional remarks.

15. The method of claim 11, wherein the package quotation includes any of budget, destination, origin, departure and return dates, preference of hotel type, preference of hotel room, preference of meal type, preference of flight type, flight class, number of passengers, and additional remarks.

16. A system for processing a travel-related request from a customer comprising:

means for receiving customer information regarding a travel related package, including a flight booking request that includes flexible travel dates;

means for storing in a local database the customer information;

means for sending a first agent notification to an agent, wherein the agent can access package request details in the database;

means for sending to the agent agent notifications if the agent fails to respond within a first predetermined period of time;

means for displaying to the agent the package request details;

means for querying a Global Distribution System for a quotation, including querying a Private Fares database, wherein the Private Fares are offered by a particular airline to a particular travel agent;

means for receiving a response from the agent;

means for notifying the customer of the response from the agent;

means for notifying the customer if a flight is available at a fare within a range specified by the customer in the flight booking request;

means for displaying to the customer a package quotation based on the response from the agent, including only actually available fares to the customer based on the quotation from the Global Distribution System, but not any phantom fares, wherein the package quotation includes any of budget, destination, origin, departure and return dates, preference of hotel type, preference of hotel room, preference of meal type, preference of flight type, flight class, number of passengers, and additional remarks;

means for receiving from the customer an acceptance or rejection;

means for notifying the agent of the details of the acceptance; and means for removing the customer from an active search list.

* * * * *